(12) United States Patent
Shinohara et al.

(10) Patent No.: US 8,479,040 B2
(45) Date of Patent: Jul. 2, 2013

(54) STORAGE SYSTEM AND CONTROL METHOD

(75) Inventors: Daisuke Shinohara, Yokohama (JP); Yukinori Sakashita, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 650 days.

(21) Appl. No.: 12/665,235

(22) PCT Filed: Sep. 2, 2009

(86) PCT No.: PCT/JP2009/004315
§ 371 (c)(1),
(2), (4) Date: Dec. 17, 2009

(87) PCT Pub. No.: WO2011/027388
PCT Pub. Date: Mar. 10, 2011

(65) Prior Publication Data
US 2011/0191639 A1    Aug. 4, 2011

(51) Int. Cl.
*G06F 11/00* (2006.01)
(52) U.S. Cl.
USPC .......................................... 714/6.2; 714/6.3
(58) Field of Classification Search
None
See application file for complete search history.

(56) References Cited

U.S. PATENT DOCUMENTS

| | | | |
|---|---|---|---|
| 7,146,524 B2 * | 12/2006 | Patel et al. ............. | 714/6.23 |
| 7,174,425 B2 * | 2/2007 | Kaneda et al. ............. | 711/117 |
| 2003/0009619 A1 | 1/2003 | Kano | |
| 2004/0193969 A1 * | 9/2004 | Nemoto et al. ............. | 714/100 |
| 2005/0091455 A1 | 4/2005 | Kano | |
| 2005/0188252 A1 * | 8/2005 | Amano ............. | 714/6 |
| 2005/0204154 A1 | 9/2005 | Osaki | |
| 2008/0092029 A1 | 4/2008 | Arakawa et al. | |
| 2008/0215843 A1 | 9/2008 | Nasu | |
| 2008/0260159 A1 | 10/2008 | Osaki | |
| 2009/0271638 A1 | 10/2009 | Kawakami | |

FOREIGN PATENT DOCUMENTS

| | | |
|---|---|---|
| EP | 1596303 A2 | 11/2005 |
| EP | 1975838 | 10/2008 |
| EP | 2012226 A2 | 1/2009 |
| JP | 2003-015915 | 1/2003 |
| JP | 2009065528 | 3/2009 |

OTHER PUBLICATIONS

International Search Report and Written Opinion for PCT International Application No. PCT/JP2009/004315, mailed Mar. 30, 2010.

* cited by examiner

*Primary Examiner* — Michael Maskulinski
(74) *Attorney, Agent, or Firm* — Brundidge & Stanger, P.C.

(57) ABSTRACT

Provided are a storage system and its control method having superb functionality of being able to notify an administrator of the extent of impact of a pool fault in an easy and prompt manner. The foregoing storage system and its control method manage a storage area provided by a storage medium by dividing it into multiple pools, provide a virtual logical device to a host system, dynamically allocate a storage area to the logical device according to a data write request from the host system for writing data into the logical device, move data that was written into the logical device to another pool according to the access status from host system to such data, identify, when a fault occurs in any one of the pools, an extent of impact of the fault based on the correspondence relationship of the logical device and the pool, and notify the identified extent of impact of the fault to an administrator.

9 Claims, 21 Drawing Sheets

| DEVICE ID | ALLOCATED POOL ID | USED SIZE | ASSUMED POOL USAGE RATE ||||
|---|---|---|---|---|---|---|
| | | | 1 | 2 | 3 | 4 |
| 1 | 1, 2 | 0.2 TB | 50 % | 50 % | | |
| 2 | 1, 2, 3 | 2 TB | 20 % | 30 % | 50 % | |
| 3 | 2, 3, 4 | 5 TB | | 10 % | 30 % | 60 % |
| ⋮ | ⋮ | ⋮ | ⋮ | ⋮ | ⋮ | ⋮ |

FIG.5A

| RAID GROUP ID | RAID LEVEL | PHYSICAL DISK ID | PHYSICAL DISK TYPE | SIZE |
|---|---|---|---|---|
| 1 | RAID1 | 11 | FC | 100000000000 |
| 1 | RAID1 | 12 | FC | 100000000000 |
| 2 | RAID1 | 21 | SATA | 100000000000 |
| 2 | RAID1 | 22 | SATA | 100000000000 |
| ⋮ | ⋮ | ⋮ | ⋮ | ⋮ |
| 60A | 60B | 60C | 60E | 60E |

| POOL ID | RAID GROUP ID | POOL START ADDRESS | SIZE |
|---|---|---|---|
| 1 | 1 | 0 | 100000000000 |
| 2 | 2 | 0 | 100000000000 |
| 2 | 3 | 100000000000 | 100000000000 |
| ⋮ | ⋮ | ⋮ | ⋮ |
| 61A | 61B | 61C | 61D |

| DEVICE ID | POOL ID | DEVICE START ADDRESS | POOL START ADDRESS | USED SIZE | LAST ACCESS DATE AND TIME |
|---|---|---|---|---|---|
| 1 | 1 | 0 | 0 | 1000 | 05/20/2009 00:00:00 |
| 1 | 2 | 1000 | 0 | 1000 | 05/17/2009 00:00:00 |
| 2 | 1 | 0 | 1000 | 1000 | 05/20/2009 00:00:00 |
| 2 | 2 | 1000 | 1000 | 1000 | 05/17/2009 00:00:00 |
| 2 | 3 | 2000 | 0 | 1000 | 05/15/2009 00:00:00 |
| 3 | 2 | 0 | 2000 | 1000 | 05/17/2009 00:00:00 |
| 3 | 3 | 1000 | 1000 | 1000 | 05/15/2009 00:00:00 |
| 3 | 4 | 2000 | 0 | 1000 | 05/10/2009 00:00:00 |
| ... | ... | ... | ... | ... | ... |

FIG.7

| SOURCE POOL ID | DESTINATION POOL ID | MIGRATION CONDITION |
|---|---|---|
| 1 | 2 | UNUSED FOR 3 DAYS |
| 2 | 3 | UNUSED FOR 5 DAYS |
| 3 | 4 | UNUSED FOR 10 DAYS |
| ⋮ | ⋮ | ⋮ |

| DEVICE ID | ALLOCATED POOL ID | ALLOCATED SIZE |
|---|---|---|
| 1 | 1, 2 | 1 TB |
| 2 | 1, 2, 3 | 5 TB |
| 3 | 2, 3, 4 | 10 TB |
| 4 | 1, 2 | 3 TB |
| 5 | 1, 2 | 2 TB |
| 6 | 2, 3, 4 | 20 TB |
| 7 | 2, 3 | 8 TB |
| 8 | 1, 2, 3 | 15 TB |
| ⋮ | ⋮ | ⋮ |
| 56A | 56B | 56C |

| DEVICE ID | ALLOCATED POOL ID | USED SIZE | ASSUMED POOL USAGE RATE | | | |
|---|---|---|---|---|---|---|
| | | | 1 | 2 | 3 | 4 |
| 1 | 1, 2 | 0.2 TB | 50 % | 50 % | | |
| 2 | 1, 2, 3 | 2 TB | 20 % | 30 % | 50 % | |
| 3 | 2, 3, 4 | 5 TB | | 10 % | 30 % | 60 % |
| ... | ... | ... | ... | ... | ... | ... |

FIG.9B

| DEVICE ID | ALLOCATED POOL ID | USED SIZE | REAL POOL USAGE RATE | | | |
|---|---|---|---|---|---|---|
| | | | 1 | 2 | 3 | 4 |
| 1 | 1, 2 | 0.2 TB | 60 % | 40 % | | |
| 2 | 1, 2, 3 | 2 TB | 25 % | 35 % | 40 % | |
| 3 | 2, 3, 4 | 5 TB | | 30 % | 20 % | 50 % |
| ... | ... | ... | ... | ... | ... | ... |

63A / 63B / 63C / 63D (63E each sub-column) — 63

FIG.10

| POOL ID | TOTAL SIZE | USED SIZE | RISE RATE | CREATION TIME | THRESHOLD |
|---------|-----------|-----------|-----------|---------------|-----------|
| 1 | 200 TB | 80 TB | 0.2 % | 02/20/2009 00:00:00 | 80 % |
| 2 | 500 TB | 440 TB | 0.1 % | 01/17/2009 00:00:00 | 90 % |
| 3 | 700 TB | 600 TB | 0.1 % | 01/20/2009 00:00:00 | 90 % |
| 4 | 100 TB | 30 TB | 0.2 % | 02/17/2009 00:00:00 | 80 % |
| 5 | 300 TB | 200 TB | 0.1 % | 0115/2009 00:00:00 | 90 % |
| 6 | 400 TB | 100 TB | 0.15 % | 0117/2009 00:00:00 | 85 % |
| 7 | 250 TB | 170 TB | 0.2 % | 02/15/2009 00:00:00 | 80 % |
| 8 | 300 TB | 180 TB | 0.1 % | 01/10/2009 00:00:00 | 90 % |
| ... | ... | ... | ... | ... | ... |

FIG.17

| DEVICE ID | POOL ID | EXPANDED POOL ID | DEVICE START ADDRESS | POOL START ADDRESS | USED SIZE | LAST ACCESS DATE AND TIME |
|---|---|---|---|---|---|---|
| 2 | 3 | 2 | 5000 | 1000 | 1000 | 05/15/2009 00:00:00 |
| 2 | 3 | 2 | 6000 | 2000 | 1000 | 05/15/2009 00:00:00 |
| 2 | 3 | 2 | 7000 | 3000 | 1000 | 05/20/2009 00:00:00 |
| 2 | 3 | 2 | 8000 | 4000 | 1000 | 05/15/2009 00:00:00 |
| 2 | 3 | 2 | 9000 | 5000 | 1000 | 05/15/2009 00:00:00 |
| 84A | 84B | 84C | 84D | 84E | 84F | 84G |

84

STORAGE SYSTEM AND CONTROL METHOD

TECHNICAL FIELD

The present invention generally relates to a storage system and its control method, and in particular can be suitably applied to a storage system that provides a virtual logical device to a host system.

BACKGROUND ART

Conventionally, a SAN (Storage Area Network) is widely known as technology for connecting a server computer and a storage system in a computer system. In a computer system that uses a SAN, the server computer and the storage system are connected via a high speed network such as a fibre channel (FC).

In the foregoing computer system, the logical device to be provided to the server computer by the storage system may be a physical storage area (this is hereinafter referred to as a "real storage area") in the amount of capacity to be provided to the server computer, or a virtual storage area that is to be dynamically allocated the real storage area.

Patent Document 1 below discloses technology of providing a virtual logical device to the host system, and dynamically allocating a real storage area according to a data write request issued from the host system for writing data into the logical device.

Conventionally, other proposals have been made including a logical device management system of allocating a logical device from one or more pools of different disk types, and a logical device management system of limiting the combination of pools according to the requirements of reliability, performance and so on of the logical device.

DISCLOSURE OF THE INVENTION

Meanwhile, the operation of associating a plurality of pools with a virtual logical device in advance and, in accordance with the access status from the server computer to data written into the logical device, moving that data from a pool that is allocating a real storage area to the logical device (this is hereinafter referred to as the "real storage area allocating pool") to another pool that has been associated with that logical device is being performed from the past.

In this kind of operation, if a fault occurs in a certain pool, in addition to affecting the logical device to which the real storage area was allocated from the pool that was subject to a fault, there are cases where the fault will also affect logical volumes to which a real storage area is not allocated from that pool.

For example, in an operation where first and second pools are associated with a certain logical device, let it be assumed that data stored in a real storage area provided by the first pool is to be moved to the second pool according to the access status thereof, and that a fault occurred in the second pool.

In the foregoing case, since data to be moved from the first pool to the second pool can no longer be moved, the capacity usage rate of the first pool will increase sharply. Under the foregoing circumstances, if the first pool is also associated with other logical devices, depending on the capacity usage status of that first pool, a situation may arise where it will not be possible to allocate a real storage area from the first pool to such other logical devices (that is, the server computer will not be able to write data into the other logical devices).

However, under normal circumstances, it is difficult for an administrator of the computer system to accurately keep track of the extent of impact of such pool fault, and there is a problem in that the administrator is unable to take appropriate measures.

The present invention was devised in view of the foregoing circumstances. Thus, an object of this invention is to provide a storage system and its control method having superb functionality of being able to notify an administrator of the extent of impact of a pool fault in an easy and prompt manner.

In order to achieve the foregoing object, the present invention provides a storage system connected to a host system comprising a storage medium for storing data sent from the host system, and a controller including a memory and a processor. With this storage system, the controller comprises a configuration management unit for managing a storage area provided by the storage medium by dividing it into a plurality of pools, providing a virtual logical device to the host system, and dynamically allocating the storage area to the logical device from a pool associated with the logical device according to a data write request from the host system for writing data into the logical device, a migration unit for changing the pool to allocate the storage area to an area that stored the data in the logical device to another pool according to an access status from the host system to the data written into the logical device, and controlling the storage medium for moving the data to the other pool, and a fault management unit for managing a correspondence relationship of the logical device and the pool, identifying, when a fault occurs in any one of the pools, an extent of impact of the fault based on the correspondence relationship of the logical device and the pool, and notifying the identified extent of impact of the fault to an administrator.

The present invention additionally provides a control method of a storage system comprising a storage medium for storing data sent from the host system, and a controller. This control method comprises a first step of the controller managing a storage area provided by the storage medium by dividing it into a plurality of pools, providing a virtual logical device to the host system, and dynamically allocating the storage area to the logical device from a pool associated with the logical device according to a data write request from the host system for writing data into the logical device, a second step of the controller changing a pool to allocate the storage area to an area that stored the data in the logical device to another pool according to an access status from the host system to the data written into the logical device, and controlling the storage medium for moving the data to the other pool, and a third step of the controller identifying, when a fault occurs in any one of the pools, an extent of impact of the fault based on the correspondence relationship of the logical device and the pool, and notifying the identified extent of impact of the fault to an administrator.

According to the present invention, when a fault occurs in a pool, the extent of impact of such fault can be identified and notified to the administrator. Thus, the administrator will be able to easily and promptly recognize the location of the fault and the extent of impact of the fault, and the functionality of the computer system can thereby be improved.

BRIEF DESCRIPTION OF THE DRAWINGS

FIG. 5A is a conceptual diagram explaining a RAID group configuration management table;

FIG. 5B is a conceptual diagram explaining a pool configuration management table;

FIG. 6 is a conceptual diagram explaining a device mapping management table;

FIG. 7 is a conceptual diagram explaining a migration policy management table;

FIG. 8 is a conceptual diagram explaining a device allocation management table;

FIG. 9A is a conceptual diagram explaining an assumed pool allocation management table;

FIG. 9B is a conceptual diagram explaining a real pool allocation management table;

FIG. 10 is a conceptual diagram explaining a threshold management table;

FIG. 17 is a conceptual diagram explaining a pool expansion management table;

Figure 1:
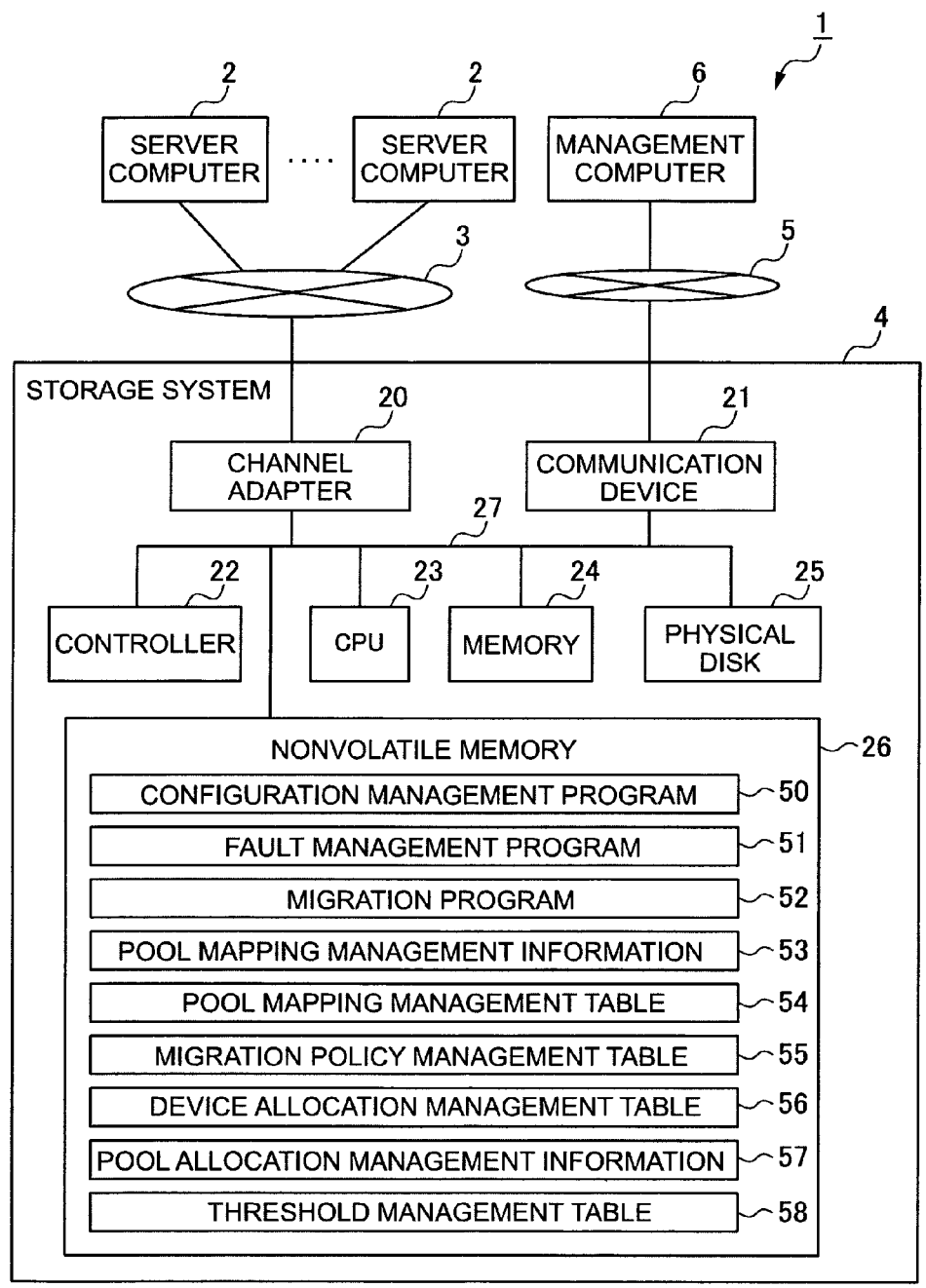
FIG. 1 is a block diagram showing the overall configuration of a computer system according to the first embodiment.

EXPLANATION OF REFERENCE NUMERALS 1, 80, 90 . . . computer system, 2 . . . server computer, 4, 81, 91 . . . storage system, 6 . . . management computer, 23 . . . CPU, 25 . . . physical disk, 26 . . . nonvolatile memory, 40 . . . RAID group, 41 . . . pool, 42 . . . logical device, 50 . . . configuration management program, 51 . . . fault management program, 52 . . . migration program, 53 . . . pool mapping management information, 54 . . . device mapping management table, 55 . . . migration policy management table, 56 . . . device allocation management table, 57 . . . pool allocation management information, 58 . . . threshold management table, 60 . . . RAID group configuration management table, 61 . . . pool configuration management table, 70 . . . fault impact extent display screen, 82 . . . reserved physical disk, 83 . . . pool expansion program, 84 . . . pool expansion management table, pool reconstruction program.

BEST MODE FOR CARRYING OUT THE INVENTION

An embodiment of the present invention is now explained in detail with reference to the attached drawings.

(1) First Embodiment (1-1) Configuration of Computer System in Present Embodiment FIG. 1 shows the overall computer system 1 according to this embodiment. The computer system 1 is configured by one or more server computers 2 being connected to a storage system 4 via a first speed network 3, and a management computer 6 being connected to the storage system 4 via a second speed network 5.

Figure 2:
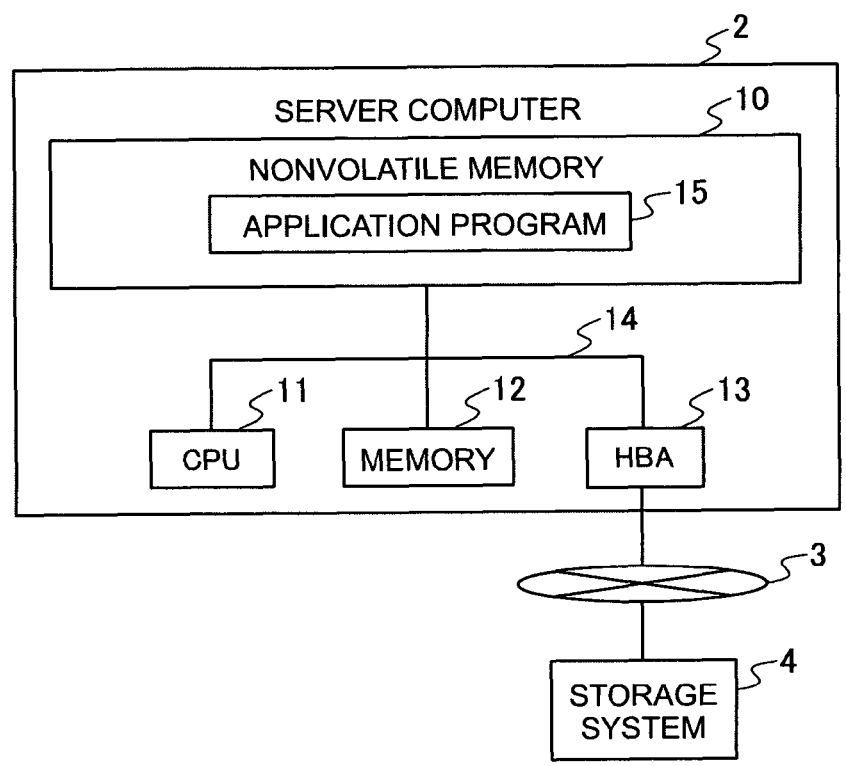
FIG. 2 is a block diagram showing the configuration of a server computer.

The server computer 2 comprises, as shown in FIG. 2, a nonvolatile memory 10, a CPU (Central Processing Unit) 11, a memory 12 and a host bus adapter (HBA) 13, and is configured by these components being mutually connected via a system bus 14.

The nonvolatile memory 10 stores an application program 15 in addition to the various types of programs including an OS (Operating System) required for operating the server computer 2, as well as various types of data. When the application program 15 is executed, the server computer 2 read and writes data from and into the storage system 4. Incidentally, a plurality of application programs 15 may be stored in the nonvolatile memory 10.

The CPU 11 is a processor that governs the operational control of the overall server computer 2, loads various types of programs such as the application program 15 from the nonvolatile memory 10 into the memory 12 during the start-up of the server computer 2, and executes the loaded programs.

The memory 12 is used as a work memory of the CPU 11, and stores programs that were read from the nonvolatile memory 10 and data that is created upon the execution of such programs.

The host bus adapter 13 is an interface for performing protocol control during the communication with the storage system 4, and sends and receives various types of commands and data to and from the storage system 4.

The first speed network 3 is an I/O channel to be used by the server computer 2 for reading and writing data from and into the storage system 4 and is configured, for instance, from a SAN. Internet, dedicated line, public line or the like. If the first speed network 3 is a SAN, the communication between the server computer and the storage system 4 is conducted according to a fibre channel protocol.

The storage system 4 is configured, as shown in FIG. 1, by physical resources such as a channel adapter 20, a communication device 21, a controller 22, a CPU 23, a memory 24, a physical disk 25 and a nonvolatile memory 26 being connected via a system bus 27.

The channel adapter 20 is an interface for performing protocol control during the communication with the server computer 2, and sends and receives various types of commands and data to and from the server computer 2. The communication device 21 is an interface for performing protocol control during the communication with the management computer 6, and sends and receives various types of commands and data to and from the management computer 6.

The controller 22 performs the control of the channel adapter 20, the communication device 21, the CPU 23, the memory 24 and the physical disk 25. A plurality of controllers 22 may be provided, and may also be configured as a plurality of devices that perform different processing depending on the control target such as for performing the control of the channel adapter 20 or performing the control of the physical disk 25.

The CPU 23 is a processor for governing the operational control of the overall storage system 4, loads necessary programs during the start-up of the storage system 4 from the nonvolatile memory 26 to the memory 24, and executes necessary control processing and arithmetic processing based on the loaded programs.

The memory 24 is used as a work memory of the CPU 23 and stores programs that were read from the nonvolatile memory 26 and data that is created upon the execution of such programs.

The physical disk 25 is configured from an expensive disk such as a SCSI disk or an inexpensive disk such as a SATA (Serial AT Attachment) disk or an optical disk. Data from the server computer 2 is read from and written into the storage area provided by the physical disk 25.

The nonvolatile memory 26 stores various types of programs that are required in the operation of the storage system 4, and various types of data.

The second speed network 5 is a communication channel that is used when the management computer 6 collects management information from the storage system 4 or performing various types of settings in the storage system 4 and is configured, for instance, from a LAN (Local Area Network), Internet, dedicated line, public line or the like. If the second speed network 5 is a LAN, the communication between the management computer 6 and the storage system 4 is conducted according to a TCP/IP (Transmission Control Protocol/Internet Protocol) protocol.

Figure 3:
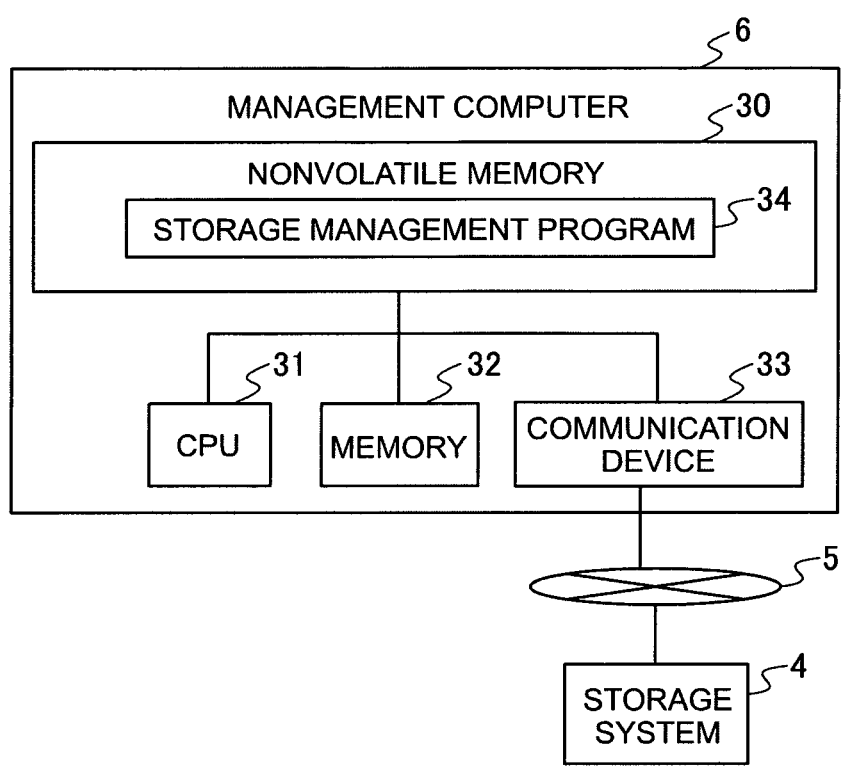
FIG. 3 is a block diagram showing the configuration of a management computer.

The management computer 6 comprises, as shown in FIG. 3, a nonvolatile memory 30, a CPU 31, a memory 32 and a communication device 33.

The nonvolatile memory 30 stores a storage management program 34 in addition to the various types of programs including an OS required for operating the server computer 2, as well as various types of data. The storage management program 34 is a program for displaying the configuration information of the storage system 4, operating the configuration setting of the storage system 4, and receiving various types of notifications including the fault notification from the storage system. The administrator is able to allocate the physical resources of the storage system 4 to the server computer 2 and monitor the operational status by executing the storage management program 34 of the management computer 6.

The CPU 31 is a processor for governing the operational control of the overall management computer 6, loading necessary programs during the start-up of the management computer 6 from the nonvolatile memory 30 to the memory 32, and executing necessary control processing and arithmetic processing based on the loaded programs.

The memory 32 is used as a work memory of the CPU 31 and stores programs that were read from the nonvolatile memory 30 and data that is created upon the execution of such programs.

The communication device 33 is an interface for performing protocol control during the communication with the storage system 4, and sends and receives various types of commands and data to and from the storage system 4.

(1-2) Data Migration Function and Fault Extent Notification Function (1-2-1) Outline and Configuration of Various Types of Tables The data migration function and the fault extent notification function loaded in the storage system 4 are now explained. The data migration function is foremost explained.

Figure 4:
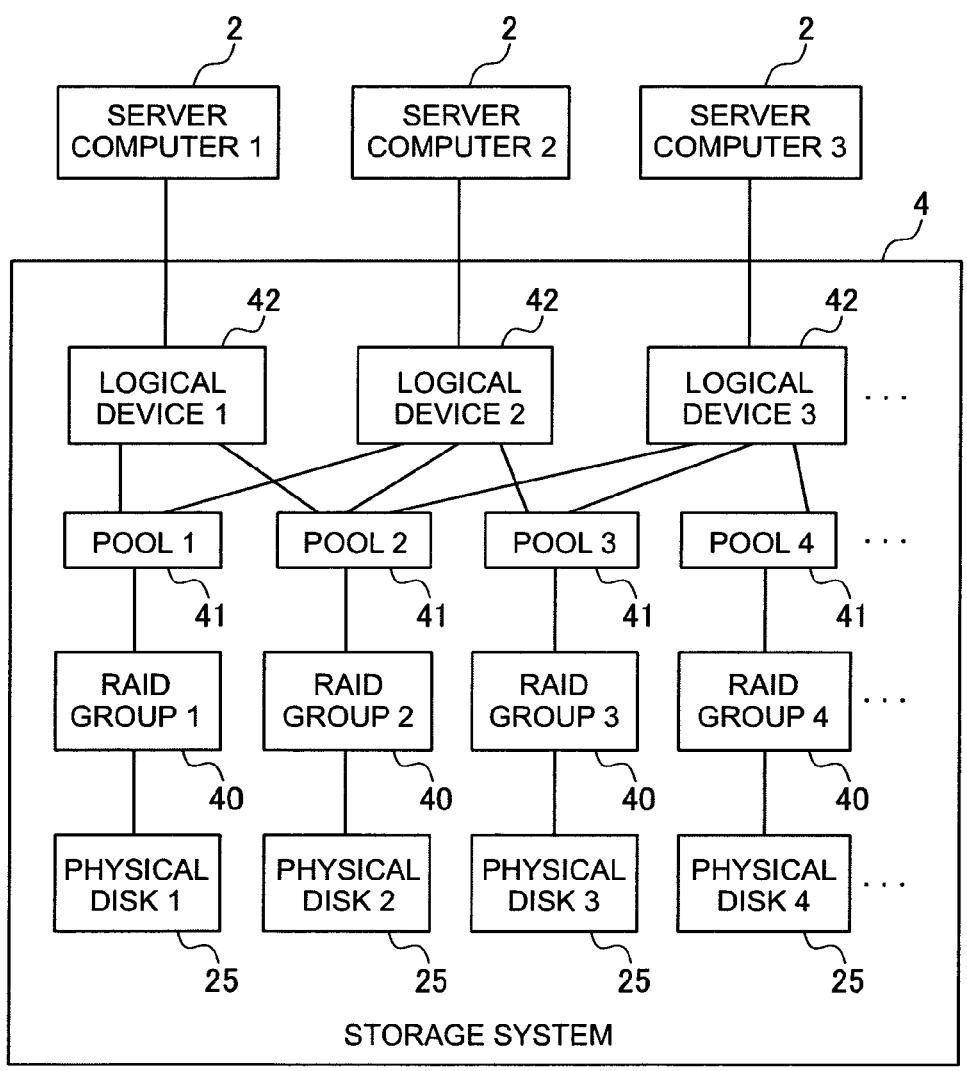
FIG. 4 is a conceptual diagram explaining the relationship of a physical disk, a RAID group, a pool and a logical device in the storage system.

In the storage system 4, as shown in FIG. 4, one RAID (Redundant Arrays of Inexpensive Disks) group 40 is formed from one or more physical disks 25, and one pool 41 is formed from a storage area provided by the one or more RAID groups 40.

The pools 41 are classified into a plurality of types according to the RAID level of the RAID group 40 providing the storage area to that pool 41, and in accordance with the response performance and reliability of the physical disks 25 configuring the RAID group. In the ensuing explanation, although the pools 41 are classified based on the response performance of the physical disks 25 configuring the pools 41, the method of classifying the pools 41 is not limited to the response performance of the physical disks 25.

The pools 41 are respectively associated with one or more logical devices 42 which are provided to the server computer 2 by the storage system 4. The logical devices 42 are unsubstantial virtual storage devices. The server computer 2 sends to the storage system 4 a write request or a read request which designates a prescribed location in the logical device 42 as the write destination or the read destination of data.

If the storage system 4 receives a write request and a real storage area is allocated to the storage area in the logical device 42 that was designated as the write destination of data in the write request, it allocates a real storage area to that storage area from any one of the pools associated with that logical device, and writes in that real storage area, together with the write request, the write-target data that was given from the server computer 2.

If the storage system 4 receives a read request from the server computer 2, it reads data from the real storage area corresponding to the corresponding pool that is allocated to the storage area in the logical device 42 that is designated in the read request, and sends such data to the server computer 2.

Meanwhile, the storage area that is provided by the logical device 42 to the server computer 2 is divided into a plurality of areas, and the real storage area is allocated from the pool 41 with the individual areas that were divided (these are hereinafter referred to as the "divided areas") as the unit.

In the foregoing case, with the present embodiment, each of the plurality of pools 41 with difference response performances is associated with the respective logical devices 42. When the storage system 4 is to initially allocate a real storage area to a divided area for each divided area of the logical device 42, it allocates the real storage area from the pool 41 having the highest response performance among the plurality of pools 41 associated with that logical device.

Subsequently, in accordance with the access status (access frequency, etc.) from the service computer 2 to the data written into that divided area, the storage system 4 changes the real storage area allocating pool to allocate the real storage area to that divided area to a pool 41 with a lower response performance among the plurality of pools 41 associated with that logical device 42. Here, the storage system 4 moves the data written into that divided area from the pre-change real storage area allocating pool 41 to the post-change real storage area allocating pool 41 (data migration function).

Meanwhile, with the storage system 4 loaded with the foregoing data migration function, if a fault occurs in the configuration element (physical disk 25, etc.) of a certain pool 41 as described above, in addition to the logical device 42 to which the real storage area is allocated from that pool 41, other logical devices 42 to which a real storage area is not allocated from the pool 41 subject to the fault may also be affected by said fault.

Thus, the storage system 4 of this embodiment is loaded with a fault extent notification function of identifying the extent of impact of a fault when such fault occurs in any one of the pools 41, and notifying the fault to the administrator.

As means for realizing the foregoing data migration function and the fault extent notification function, the nonvolatile memory 26 (FIG. 1) of the storage system 4 stores, as shown in FIG. 1, a configuration management program 50, a fault management program 51, a migration program 52, pool mapping management information 53, a device mapping management table 54, a migration policy management table 55, a device allocation management table 56, pool allocation management information 57, and a threshold management table 58.

The configuration management program 50 is a program for managing the configuration of the physical resources such as the channel adapter 20, the communication device 21, the controller 22, the CPU 23, the memory 24, the physical disk 25 and the nonvolatile memory 26, and the configuration of the logical resources such as the logical device 42 (FIG. 4) and the pool 41.

The storage system 4 returns the requested configuration information of the physical resources and/or the logical resources in the storage system 4 according to the configuration information acquisition request from the management computer 6 based on the configuration management program 50, and changes or newly sets the configuration of the corresponding physical resources and/or the logical resources in the storage system 4 according to the configuration setting request from the management computer 6.

Based on the configuration management program 50, the storage system 4 manages the storage area provided by a plurality of physical disks 25 by dividing it into a plurality of pools 41 as described above, provides a logical device 42 to the server computer 2, and dynamically allocates a real storage area to that logical device 42 from the pool 41 associated with that logical device 42 according to a data write request from the server computer 2 for writing data into that logical device.

The fault management program 51 is a program for detecting a fault that occurred in the physical resources and the logical resources of the storage system 4, and executing measures according to the contents of that fault. The "measures according to the contents of the fault" include, as described later, the processing of identifying the extent of impact of a fault when such fault occurs in any one of the pools 41, and notifying the administrator of the extent of impact of the identified fault, as well as fault avoidance processing, and so on.

The migration program 52 is a program for changing the pool (real storage area allocating pool) 41 to allocate a real storage area to the logical devices 42 among a plurality of pools 41 associated with that logical device 42, and moving data stored in the pre-change pool 41 to the post-change pool 41. The storage area provided by the logical device 42 is divided into a plurality of divided areas as described above, and a real storage area is allocated from the real storage area allocating pool 41 for each divided area. The storage system 4 subsequently changes the storage area allocated pool 41 to another pool 41 for each divided area based on the access status to the data stored in that divided area and according to the migration policy described later, and moves the data stored in the pre-change storage area allocated pool 41 to the post-change storage area allocated pool 41.

The pool mapping management information 53 is information for managing the configuration of the RAID group 40 (FIG. 4) and the pools 41 defined in the storage system 4, and is configured from a RAID group configuration management table 60 (FIG. 5A) and a pool configuration management table 61 (FIG. 5B).

Among the above, the RAID group configuration management table 60 is a table for managing the configuration of the RAID group 40 and is configured, as shown in FIG. 5A, from a RAID group ID column 60A, a RAID level column 60B, a physical disk ID column 60C, a physical disk type column 60D and a size column 60E.

The physical disk ID column 60C stores the ID (physical disk ID) of the physical disk 25 (FIG. 1) disposed in the storage system 4, and the physical disk type column 60D stores the type (FC, SATA, etc.) of that physical disk 25. The size column 60E stores the capacity of the physical disk 25.

The RAID group ID column 60A stores the ID (RAID group ID) of the RAID group 40 configured by that physical disk 25, and the RAID level column 60B stores the RAID level ("0" to "6") of the RAID group 40.

Accordingly, the case of the example illustrated in FIG. 5A shows that a plurality of RAID groups 40 having a RAID group ID of "1," "2," . . . are defined in the storage system 4. Moreover, among the above, for instance. FIG. 5A shows that the RAID group 40 with the RAID group ID of "1" is configured from two physical disks 25 respective having a physical disk ID of "1" or "2," wherein the type is "FC," the capacity is "100000000000," and the RAID level is "RAID 1."

The pool configuration management table 61 is a table for managing the configuration of the pool 41 (FIG. 4) and is configured, as shown in FIG. 5B, from a pool ID column 61A, a RAID group ID column 61B, a pool start address column 61C, and a size column 61D.

The RAID group ID column 61B stores the group ID of the respective RAID groups 40 defined in the storage system 4, and the pool ID column 61A stores the ID (pool ID) of the pool (RAID group configuring that pool) 41 with which that RAID group 40 is associated.

The pool start address column 61C stores the start address of the range in which the RAID group 61B is associated with the real storage area in that pool 41, and the size column 61D stores the size of the range in which that RAID group 40 is associated with that pool 41.

Accordingly, the case of the example illustrated in FIG. 5B shows that, among the RAID groups 40 defined in the storage system 4, for instance, the RAID group 40 having a RAID group ID of "1" includes a storage area provided by the RAID group 40 having a RAID group ID of "1," the start address of the range of the real storage area in the pool 41 is "0," and the size of that storage area is "100000000000."

The device mapping management table 54 is a table for managing the correspondence relationship of the respective divided areas of the logical device 42, and the pools 41 and is configured, as shown in FIG. 6, a device ID column 54A, a pool ID column 54B, a device start address column 54C, a pool start address column 54D, a used size column 54E and a last access date and time column 54F.

The device ID column 54A stores the device ID of the corresponding logical device 42, and the device start address column 54C and the used size column 54E respectively store the start address and the size of the corresponding divided areas in that logical device 42.

The pool ID column 54B and the pool start address column 54D respectively store the pool ID of the pool 41 that is set so as to allocate a real storage area to that divided area of the logical device 42, and the start address of the real storage area in that pool 41 that is associated with that divided area of the logical device 42. Incidentally, the size of the real storage area in the pool 41 that is associated with that divided area of the logical device 42 is the same as the size stored in the used size column 54E.

The last access date and time column 54F stores the date and time that the server computer 2 last accessed that divided area of the logical device 42.

Accordingly, the case of the example illustrated in FIG. 6 shows that, with the logical device 42 having a device ID of "1," the storage area in that logical device 42 from an address of "0" to a size of "1000" is partitioned as a single divided area, and that divided area is allocated with a real storage area from an address of "0" to a size of "1000" of the pool 41 having a pool ID of "1." Moreover, FIG. 5 shows that the last access date and time of the server computer 2 to that divided area of the logical device 42 was "May 20, 2009 00:00:00."

Meanwhile, the migration policy management table 55 is a table for managing the condition for migrating (this is hereinafter referred to as the "migration condition") of data stored in the real storage area which was allocated by a certain pool (source pool) 41 to a divided area of the logical device 42 to another pool (destination pool) 41.

The migration policy management table 55 is configured, as shown in FIG. 7, from a source pool ID column 55A, a destination pool ID column 55B and a migration condition column 55C. The source pool ID column 55A stores the pool ID of the source pool 41, and the destination pool ID column 55B stores the pool ID of the destination pool 41.

The migration condition column 55C stores the migration condition for moving the data as described above. In the case of this embodiment, the transitional period from the last access date and time of the server computer 2 to the data is prescribed as the migration condition.

For instance, the example illustrated in FIG. 7 shows that, if the data stored in the real storage area allocated by the pool 41 having a pool ID of "1" to the divided area of a certain logical device 42 has been "unused for 3 days," the condition that the real storage area allocating pool 41 should be changed to the pool 41 having a pool ID of "2" is prescribed as the migration condition.

The device allocation management table 56 is a table for managing the pool 41 that is associated with the logical device 42 and is configured, as shown in FIG. 8, from a device ID column 56A, an allocated pool ID column 56B and an allocated capacity column 56C.

The device ID column 56A stores the device ID of the logical device 42, the allocated pool ID column 56B stores the pool ID of all pools that were associated as a pool 41 that is able to allocate a real storage area to that logical device 42. Incidentally, the information to be stored in the device ID column 56A and the allocated pool ID column 56B is set in advance by the administrator. The allocated capacity column 56C stores the capacity of the real storage area that was previously allocated to that logical device 42.

Accordingly, the case of the example illustrate in FIG. 8 shows that the pools 41 having a pool ID of "1" and "2" are associated as the pools 41 that are able to allocate a real storage area to the logical device 42 having a device ID of "1," and that "1 TB" of real storage area has already been allocated from the foregoing pools 41 to that logical device 42.

The pool allocation management information 57 is information for managing, for each logical device 42, in what kind of ratio that the respective pools 41 associated with that logical device 42 is allocating the real storage area to that logical device 42, and is configured from an assumed pool allocation management table 62 (FIG. 9A) and a real pool allocation management table 63 (FIG. 9B).

The assumed pool allocation management table 62 is a table for managing the theoretical value of the ratio of the real storage area, for each logical device 42, in which the respective pools 41 associated with that logical device 42 are assumed to allocate the real storage area to that logical device 42 and is configured, as shown in FIG. 9A, from a device ID column 62A, an allocated pool ID column 62B, a used size column 62C and an assumed pool usage rate column 62D.

The device ID column 62A stores the device ID of the logical device 42, and the allocated pool ID column 62B stores the pool ID of all pools 41 that are associated with that logical device 42. The used size column 62C stores the capacity of the real storage area that has already been allocated to the corresponding logical device 42.

The assumed pool usage rate column 62D is provided within the allocation rate column 62E by corresponding to the respective pools 41 defined in the storage system 4, and the allocation rate column 62E stores the theoretical value of the ratio of the real storage area in which the corresponding pool 41 is assumed to allocate the real storage area to the corresponding logical device 42.

Accordingly, the case of the example illustrated in FIG. 9A shows the pools 41 having a pool ID of "1" and "2" are allocated to the logical device 42 having a logical device ID of "1," a total of "0.2 TB" of real storage area have already been allocated from these two pools 41, and the ratio of the real storage area in which these two pools 41 are assumed to allocate to that logical device 42 is respectively "50%."

The real pool allocation management table 63 is a table for managing, for each logical device 42, the measured value of the ratio of the real storage area that is actually allocated to the logical device 42 by the respective pools 41 associated with that logical device 42 and is configured, as shown in FIG. 9B, from a device ID column 63A, an allocated pool ID column 63B, an used size column 63C and a real pool usage rate column 63D.

The device ID column 63A, the allocated pool ID column 63B and the used size column 63C respectively store the same information as the device ID column 62A, the allocated pool ID column 62B and the used size column 62C in the assumed pool allocation management table 62.

The real pool usage rate column 63D is provided with an allocation rate column 43E in correspondence with the respective pools 41 defined in the storage system 4, and the allocation rate column 63E stores the measured value of the ratio of the real storage area that is actually allocated by the corresponding pools 41 to the corresponding logical device 42, respectively.

Accordingly, the case of the example illustrated in FIG. 9B shows that the ratio of the real storage area that is actually allocated by the pools 41 having a pool ID of "1" and "2" to the logical device 42 having a logical device ID of "1" is respectively "60%" and "40%."

The threshold management table 58 is a table for managing the timing of expanding the pool 41 that is predetermined by the administrator and is configured, as shown in FIG. 10, a pool ID column 58A, a total size column 58B, a used size column 58C, a rise rate column 58D, a creation date and time column 58E and a threshold column 58F.

The pool ID column 58A stores the pool ID of the corresponding pool 41, and the total size column 58B stores the total capacity of that pool 41. The used size column 58C stores, among the capacity of the corresponding pool 41, the current capacity that the pool 41 has already allocated to any one of the logical devices 42.

The rise rate column 58D stores the rise rate per unit of time of the allocated amount of the real storage area that the corresponding pool 41 allocated to any one of the logical devices 42. This rise rate is calculated and updated during the writing of data (when a write access occurs) into the logical device 42. The creation date and time column 58E stores the data and time that the corresponding pool 41 was created.

The threshold column 58F stores the threshold (this is hereinafter referred to as the "usage rate threshold") of the rate of the used capacity (this is hereinafter referred to as the "usage rate") in relation to the total capacity of the corresponding pool 41. If the usage rate of any one of the pools 41 exceeds the usage rate threshold that is set regarding that pool 41, the storage system 4 notifies the management computer 6 to such effect based on the fault management program 51, and requests the administrator to expand that pool 41.

Accordingly, the case of the example illustrated in FIG. 10 shows that the pool 41 having a pool ID of "1" was created at "Feb. 20, 2009 00:00:00," "80 TB" among its total capacity of "200 TB" has already been allocated to the logical device 42, the current rise rate per day of the real storage area allocated to the logical device 42 is "0.2%," and the usage rate threshold is "80%."

Incidentally, the foregoing usage rate threshold is decided based on the period required for procuring and adding the physical disk 25 configuring the pool 41, and the rise rate in the capacity of that pool 41. As an example, the usage rate threshold can be decided based on the result of multiplying the period required for procuring and adding the physical disk 25, and the capacity rise rate of that pool 41.

(1-2-2) Specific Processing Routine of Data Migration Function and Fault Extent Notification Function The specific processing contents of the CPU 23 (FIG. 1) of the storage system 4 regarding the foregoing data migration function and the fault extent notification function are now explained.

(1-2-2-1) Data Migration Processing

As described with reference to FIG. 8, with the storage system 4 according to this embodiment, one or more pools 41 for dynamically allocating a real storage area to the respective logical devices 42 are predetermined in the respective logical devices 42.

In the foregoing case, if a plurality of pools 41 are associated with one logical device 42, the pool 41 with the highest response performance is initially set as the real storage area allocating pool. Subsequently, data stored in that real storage area allocating pool is moved to another pool 41 according to the migration condition explained with reference to FIG. 7, and the real storage area allocating pool to allocate a real storage area to the divided area that was storing the data in such logical device 42 is consequently changed to another pool 41.

For example, with the example illustrated in FIG. 7, in the case of the logical device 42 having a device ID of "1," the real storage area is initially allocated from the pool 41 having a pool ID of "1," and, subsequently, once the data stored in that real storage area becomes "unused for 3 days," that data is moved to the pool 41 having a pool ID of "2," and the real storage area allocating pool is thereafter changed to the pool 41 having a pool ID of "2."

Incidentally, although the migration policy management table 55 prescribes a migration condition to the effect of moving the data to the pool 41 having a pool ID of "3" once such data stored in the pool 41 having a pool ID of "2" becomes "unused for 5 days," for instance, since only the pools 41 having a pool ID of "1" and "2" are associated with the logical device 42 having a device ID of "1," the data written into the logical device 42 having a device ID of "1" will never be moved to the pool 41 having a pool ID of "3."

Figure 11:
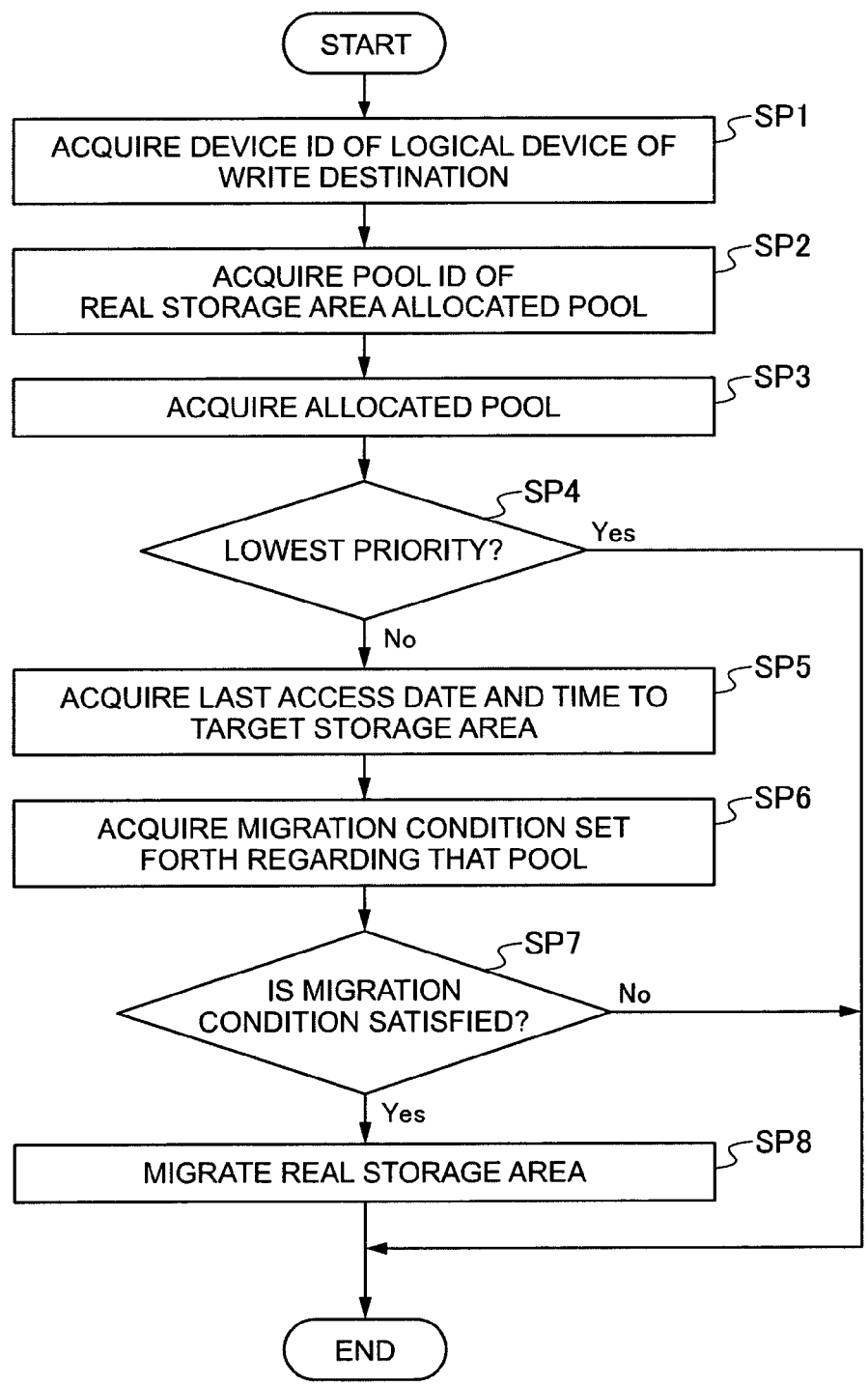
FIG. 11 is a flowchart showing the processing routine of data migration processing.

FIG. 11 shows the specific processing contents of the CPU 23 regarding the data migration processing based on the foregoing data migration function. When data writing (write access) from the server computer 2 arises, the CPU 23 executes the data migration processing shown in FIG. 11 according to the migration program 52 stored in the nonvolatile memory 26.

Specifically, when the CPU 23 receives a data write request from the server computer 2, it starts the data migration processing, and foremost acquires the device ID of the logical device 42 as the write destination of the data included in the write request (SP1).

Subsequently, the CPU 23 refers to the device mapping management table 54 (FIG. 6) based on the device ID acquired at step SP1, and acquires the pool ID of the pool (real storage area allocating pool) 41 that is providing the real storage area allocated to the storage area of the write destination of the data designated in the write request within that logical device 42 (SP2).

Subsequently, the CPU 23 refers to the device allocation management table 56 (FIG. 8) and acquires the pool ID of all pools 41 associated with the logical device 42 of the write destination of the data designated in the write request (SP3), and determines whether there is a pool 41 that will become the destination of the data subsequently to the pool 41 of the pool ID acquired at step SP2 by referring to the acquired pool ID of the respective pools 41 and the migration policy management table 55 (FIG. 7) (SP4).

To obtain a negative result in the foregoing determination means that there is no other pool 41 to which data can be moved from the current real storage area allocating pool if the various types of migration conditions stored in the migration policy management table 55 are followed. Consequently, in the foregoing case, the CPU 23 ends the data migration processing.

Meanwhile, to obtain a positive result in the determination of step SP4 means that there is another pool 41 to which data can be moved from the current real storage area allocating pool. Consequently, in the foregoing case, the CPU 23 refers to the device mapping management table 54 (FIG. 6) and acquires the date and time that any one of the server computers 2 last accessed the storage area of the write destination of the data designated in the write request (SP5).

Subsequently, the CPU 23 refers to the migration policy management table 55 and acquires the migration condition that is predetermined regarding the current real storage area allocating pool (SP6), and determines whether the data stored in the current real storage area allocating pool satisfies the migration condition that is set forth regarding such real storage area allocating pool based on the last access date and time acquired at step SP5 and the migration condition acquired at step SP6 (SP7).

If the CPU 23 obtains a negative result in the foregoing determination, it ends the data migration processing.

Meanwhile, if the CPU 23 obtains a positive result in the foregoing determination, it changes the real storage area allocating pool from the current pool 41 to another pool 41 designated in the migration condition. Moreover, by controlling the corresponding physical disk 25, the CPU 23 moves the corresponding data that was stored in the original real storage area allocating pool to the new real storage area allocating pool (SP8). The CPU 23 thereafter ends the data migration processing.

(1-2-2-2) Fault Extent Notification Processing

Figure 12:
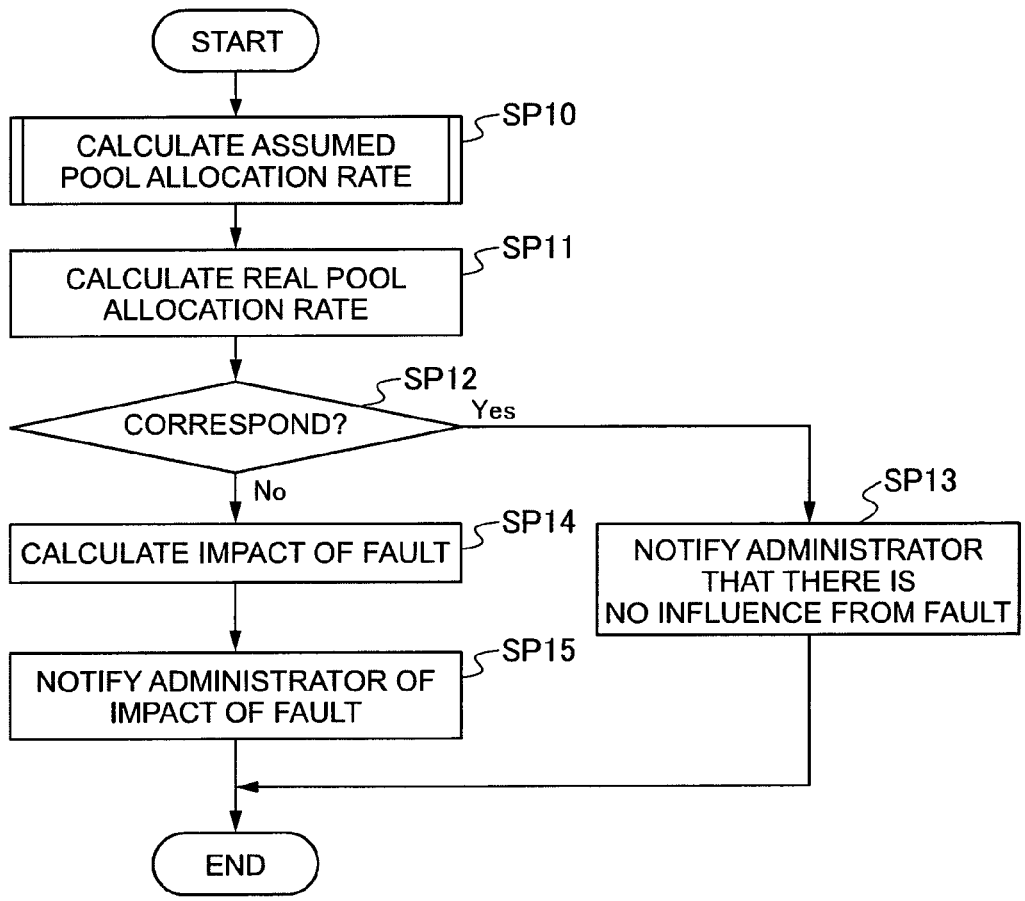
FIG. 12 is a flowchart showing the processing routine of fault extent notification processing according to the first embodiment.

Meanwhile, FIG. 12 shows the specific processing contents of the CPU 23 concerning the fault extent notification function. The CPU 23 executes the fault extent notification processing shown in FIG. 12 according to the fault management program 51.

Specifically, if a fault occurs in any one of the pools 41 (for instance, if a fault occurs in the physical disk or the like providing a storage area to that pool 41), the CPU 23 starts the fault extent notification processing. The CPU 23 foremost calculates, for each logical device 42, the theoretical value (this is hereinafter referred to as the "assumed pool allocation rate") of the ratio of the real storage area in which the respective pools 41 associated with that logical device 42 is assumed to allocate the real storage area to the respective logical devices 42 based on the migration policy management table 55 and the device allocation management table 56 (FIG. 8), and the access status to the respective divided areas of the respective logical devices 42 defined in the storage system 4, and stores the calculation result in the corresponding allocation rate column 62E (FIG. 9A) of the assumed pool usage rate column 62D (FIG. 9A) in the assumed pool allocation management table 62 (FIG. 9A) (SP10).

Subsequently, the CPU 23 calculates, for each logical device 42, measured value (this is hereinafter referred to as the "real pool allocation rate") of the real storage area that is actually allocated to that logical device 42 by the respective pools 41 associated with that logical device 42 based on the device mapping management table 54 (FIG. 6), and stores the calculation result in the corresponding allocation rate column 63E (FIG. 9B) of the real pool usage rate column 63D (FIG. 9B) in the real pool allocation management table 63 (FIG. 9B) (SP11).

The CPU 23 thereafter determines whether the assumed pool allocation rates calculated at step SP10 and the assumed pool allocation rates calculated at step SP11 all coincide (SP12).

If the CPU 23 obtains a positive result in the foregoing determination, it notifies the administrator that the impact from this fault did not extend to the other pools 41 (SP13), and thereafter ends the fault extent notification processing.

Meanwhile, if the CPU 23 obtains a negative result at step SP12, it calculates the extent of impact of such fault. Specifically, the CPU 23 calculates the rise rate of the allocated amount of the real storage area per unit of time of the pools 41 in which the real pool allocation rate is exceeding the assumed pool allocation rate, and stores the calculation result in the corresponding rise rate column 58D (FIG. 10) of the threshold management table 58 (FIG. 10). The CPU 23 thereafter determines that the pools 41 in which the rise rate exceeds a predetermined reference value to be included in the extent of impact of the fault (SP14).

The CPU 23 concurrently calculates the recommended value (this is hereinafter referred to as the "recommended threshold") of the foregoing usage rate threshold (threshold stored in the threshold column 58F (FIG. 10)) regarding the threshold management table 58 (FIG. 10) for the respective pools 41 that were determined to be included in the extent of impact of the fault (SP14).

Specifically, the foregoing recommended threshold is calculated based on the time empirically considered to be capable of recovering a pool 41 subject to a fault up to the depletion of that pool 41, the capacity of that pool 41 stored in the threshold management table 58, and the rise rate of the real allocated size per unit of time of that pool 41.

Specifically, with the time empirically considered to be capable of recovering a pool 41 subject to a fault up to the depletion of that pool 41 as T, the capacity of that pool 41 as B, and the rise rate of the real allocated size per unit of time of that pool 41 as D, if recovery is started at the timing where the remaining capacity becomes B×D×T, the recovery will be complete at the timing that the remaining capacity becomes "0." Accordingly, if the recovery processing of the pool 41 subject to a fault is not started before the remaining capacity of that pool 41 becomes B×D×T, then that pool 41 will become depleted.

Consequently, the CPU 23 calculates, for each pool 41, the recommended threshold F of the respective pools 41 that were determined to be included in the extent of impact of such fault according to the following formula:

$$F = 1 - (B \times D \times T)/B \qquad (1)$$
$$= 1 - (D \times T).$$

The CPU 23 thereafter notifies the extent of impact of the fault to the management computer 6 separate from the notification of the occurrence of the fault. The contents of the notification include the pool ID of the pools 41 included in the extent of impact of the fault and the recommended threshold of those pools 41 calculated as described above. Consequently, the administrator is able to easily keep track, through the management computer 6, of the extent of impact of the fault that occurred in the pools 41 and the recommended threshold of the respective pools 41 that were affected by the fault.

Figure 13:
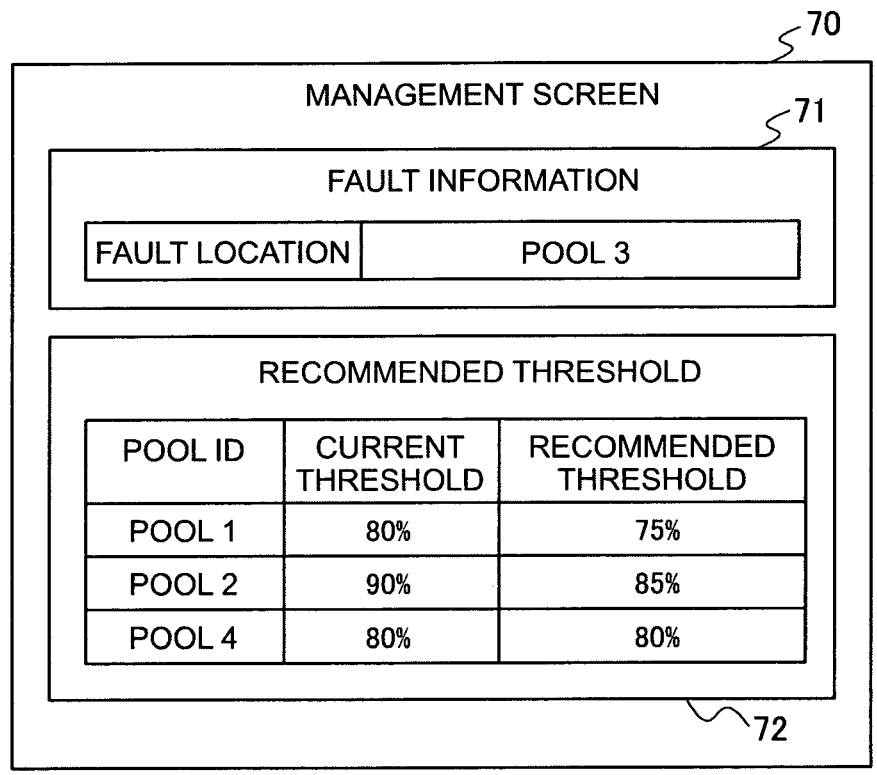
FIG. 13 is a schematic diagram showing a configuration example of a fault impact extent display screen.

FIG. 13 shows an example of a notification screen (this is hereinafter referred to as the "fault impact extent display screen") 70 that is displayed on the management computer 6 based on the foregoing notification. The fault impact extent display screen 70 is configured from a fault information column 71 and a recommended threshold column 72. The fault information column 71 displays the pool ID of the pool 41 that was subject to a fault at that time, and the recommended threshold column 72 respectively displays the pool ID of the respective pools 41 included in the extent of impact of that fault, the current usage rate threshold, and the recommended threshold. Incidentally, the foregoing information may also be displayed in a report format.

Figure 14:
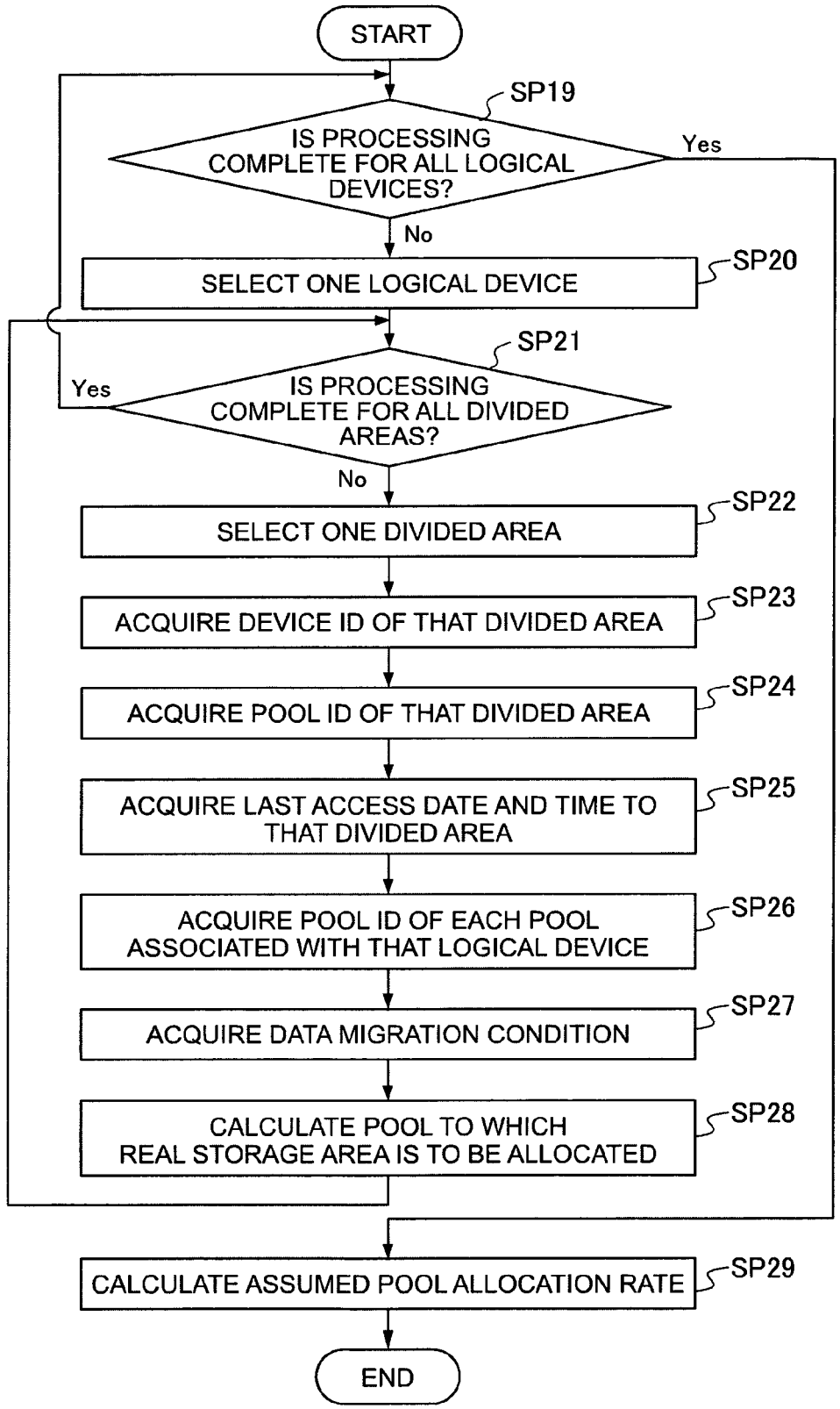
FIG. 14 is a flowchart showing the processing routine of assumed pool allocation rate calculation processing.

FIG. 14 shows the specific processing contents of the assumed pool allocation rate calculation processing to be executed at step SP10 of the fault extent notification processing explained with reference to FIG. 12. When the CPU 23 proceeds to step SP10 of the fault extent notification processing, it calculates, for each logical device 42, the allocation rate of the real storage area which is assumed to be allocated from the respective pools 41 to that logical device 42 based on the fault management program 51.

Specifically, when the CPU 23 proceeds to step SP10 of the fault extent notification processing, it starts the assumed pool allocation rate calculation processing, and foremost refers to the device allocation management table 56 and determines whether the processing of step SP21 onward explained below has been completed regarding all logical devices 42 defined in the storage system 4 (SP19).

If the CPU 23 obtains a negative result in the foregoing determination, it selects one logical device 42 in which the processing of step SP21 onward has not been completed among all logical devices 42 (SP20), and thereafter refers to the device mapping management table 54 and selects one divided area to which a real storage area was allocated from any one of the pools and to which the processing of step SP23 has not been executed among the divided areas of that logical device 42 (SP22).

Subsequently, the CPU 23 refers to the device mapping management table 54 and acquires the device ID of the logical device 42 including that divided area (SP23), and acquires the pool ID of the pool 42 that is allocating the real storage area to that divided area (SP24).

Subsequently, the CPU 23 acquires the last access date and time of the user to that divided area from the device mapping management table 54 (SP25), and thereafter acquires the pool ID of the respective pools 41 associated with the logical device 42 including that divided area from the device allocation management table 56 (SP26).

Moreover, the CPU 23 reads the migration condition for moving the data stored in the respective pools 41 acquired at step SP24 to another pool 41 from the migration policy management table 55 (SP27), and thereafter calculates the pool 41 which should be allocating the real storage area to that divided area under normal circumstances based on the last access date and time from the user to the target divided area acquired at step SP25, the pool ID of the respective pools 41 acquired at step SP26, and the migration condition acquired at step SP27 (SP28).

Subsequently, the CPU 23 returns to step SP21, and repeats the processing of step SP21 to step SP28 until it obtains a positive result at step SP21.

When the CPU 23 eventually obtains a positive result at step SP21 as a result of completing the execution of similar processing regarding all divided areas allocated with the real storage area in the target logical device 42, it returns to step SP19, and thereafter repeats the processing of step SP19 to step SP28 until it obtains a positive result at step SP19.

Figure 15:
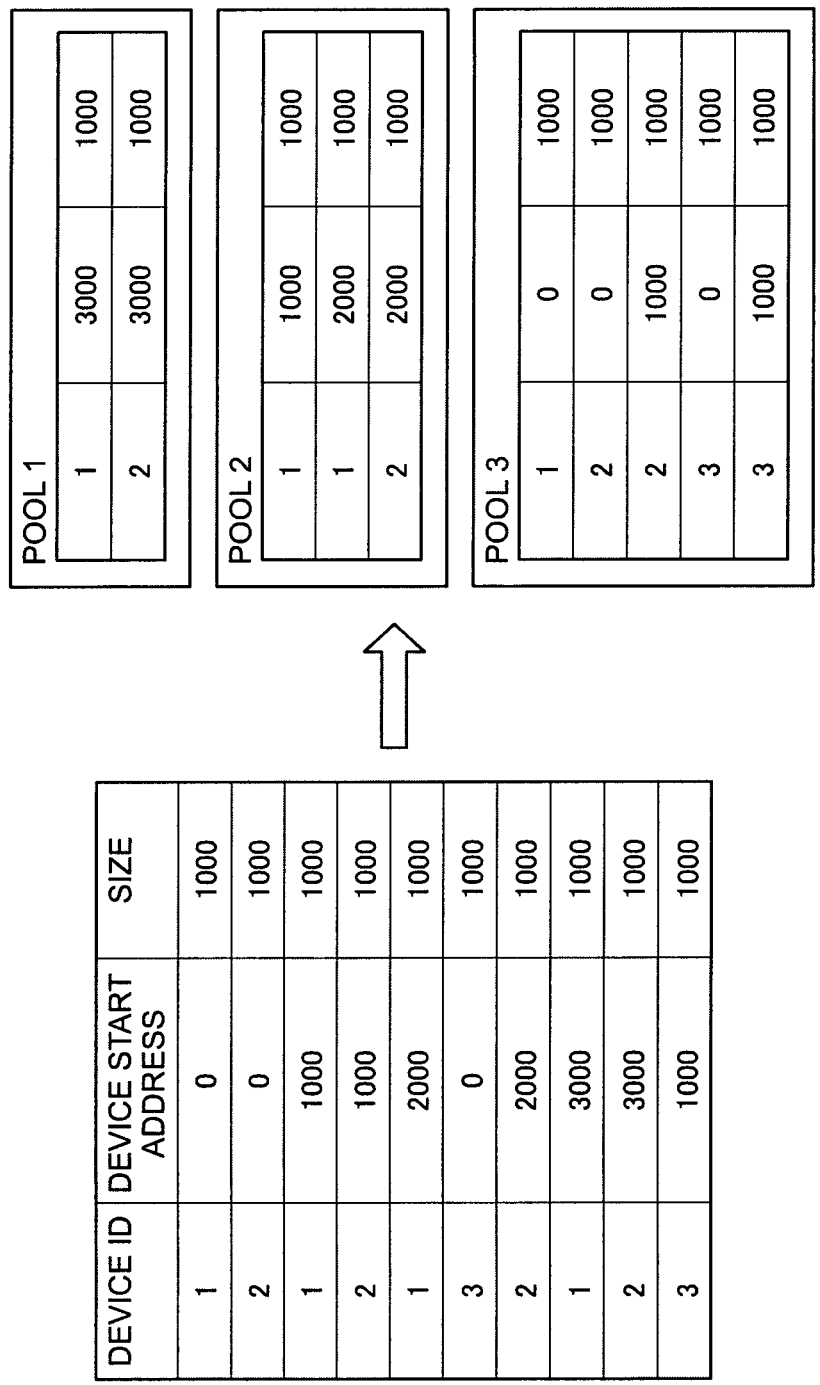
FIG. 15 is a conceptual diagram explaining assumed pool allocation rate calculation processing.

Consequently, if a divided area allocated with a real storage area from any one of the pools 41 among the logical devices 42 defined in the storage system 4 exists as shown on the left side of FIG. 15, the foregoing processing is performed to sequentially calculate the pools 41 which should have allocated the real storage area to the respective divided areas under normal circumstances as shown on the right side of FIG. 15.

When the CPU 23 eventually obtains a positive result at step SP19 as a result of completing the calculation of the pools 41 which should have allocated, under normal circumstances, the real storage area to the respective divided areas that are allocated with a real storage area from any one of the pools 41 among the divided areas of that logical device 42 regarding all logical devices 42 defined in the storage system 4, it calculates the assumed pool allocation rate for each logical device 42 based on the foregoing processing result (SP29).

For instance, in the case of the example illustrated in FIG. 15, the assumed pool allocation rate regarding the logical device 42 having a device ID of "1" is 25% for the pool 41 of "pool 1," 50% for the pool 41 of "pool 2," and 25% for the pool 41 of "pool 3." In addition, the assumed pool allocation rate regarding the logical device 42 having a device ID of "2" is 25% for the pool 41 of "pool 1," 25% for the pool 41 of "pool 2," and 50% for the pool 41 of "pool 3." Moreover, the assumed pool allocation rate regarding the logical device 42 having a device ID of "3" is 0% for the pool 41 of "pool 1," 0% for the pool 41 of "pool 2," and 100% for the pool 41 of "pool 3."

When the CPU 23 completes the calculation of the assumed pool allocation rate for each logical device 42, it thereby ends the assumed pool allocation rate calculation processing.

(1-3) Effect of Present Embodiment

As described above, with the computer system 1 according to the present embodiment, when a fault occurs in the pool 41 of the storage system 4, the extent of impact of that fault is identified and notified to the administrator. Thus, the administrator will be able to easily and promptly recognize the location of the fault and the extent of impact of the fault, and the functionality of the computer system can thereby be improved.

(2) Second Embodiment

Figure 16:
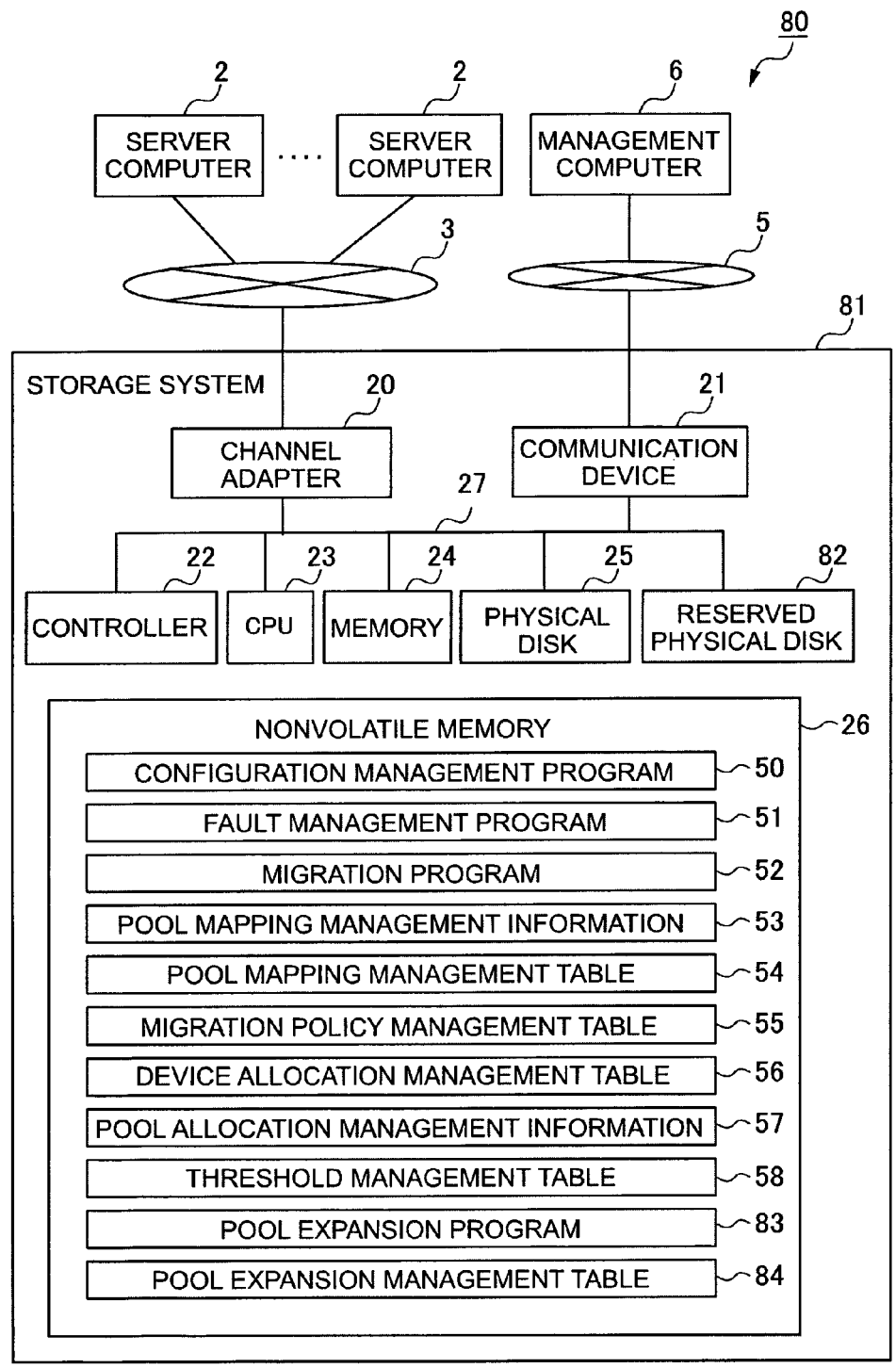
FIG. 16 is a block diagram showing the overall configuration of a computer system according to the second embodiment.

FIG. 16, in which the components corresponding to those of FIG. 1 are respectively given the same reference numerals, shows a computer system 80 according to the second embodiment. The computer system 80 is configured the same as the computer system 1 (FIG. 1) according to the first embodiment excluding the point that a plurality of reserved physical disks 82 are provided to the storage system 81, and the point that a pool expansion program 83 and a pool expansion management table 84 are additionally stored in the nonvolatile memory 26 of the storage system 81.

The reserved physical disk 82 is configured, as with the physical disk 25, from an expensive disk such as a SCSI disk or an inexpensive disk such as a SATA (Serial AT Attachment) disk or an optical disk. These reserved physical disks 82 are associated with any one of the pools 41 in advance, and are used to expand the associated pool 41.

The pool expansion program 83 is a program for temporarily expanding the capacity of the other pools 41 that will be affected by the fault in order to prevent the depletion of the capacity of the other pools 41 that will be affected by the fault when a fault occurs in any one of the pools 41.

Specifically, since data cannot be moved to a pool 41 that was subject to a fault, data will be accumulated in the pool 41 that should have moved the data to the other pool 41 according to the foregoing migration condition, and the capacity of that pool 41 will be consumed for the amount of such data. For instance, in the case of the example illustrated in FIG. 7, if a fault occurs in the pool 41 having a pool ID of "2," data will be accumulated in the pool having a pool ID of "1," and, if a fault occurs in the pool 41 having a pool ID of "3," data will be accumulated in the pool 41 having a pool ID of "2."

Thus, with the storage system 81 in the foregoing case, the capacity of the pool 41 that will be affected by that fault is expanded according to the pool expansion program 83.

The pool expansion management table 84 is a table for managing the correspondence relationship of the temporarily expanded pool 41 and the divided area in the logical device 42 to which a real storage area was allocated from that pool 41 and is configured, as shown in FIG. 17, a device ID column 84A, a pool ID column 84B, an expanded pool ID column 84C, a device start address column 84D, a pool start address column 84E, a used size column 84F and a last access date and time column 84G.

The device ID column 84A stores the device ID of the corresponding logical device 42, and the device start address column 84D stores the start address of the divided area associated with that entry in the corresponding logical device 42.

The pool ID column 84B stores the pool ID of the pool (storage area allocated pool 41) that will dynamically allocate the real storage area to that logical device 42, and the pool start address column 84E stores the start address of the real storage area that was allocated from that pool 41 to the corresponding divided area of the logical device 42.

The used size column 84F stores the size of the real storage area that the storage area allocated pool 41 allocated to the divided area corresponding to that entry (that is, the size of the corresponding divided area of the logical device 42).

The expanded pool ID column 84C stores the pool ID of the pool 41 in which the capacity was expanded when a fault occurred in the pool 41 having a pool ID stored in the pool ID column 84B of the same row.

The last access date and time column 84G stores the last access date and time from the server computer 2 to that storage area.

Figure 18:
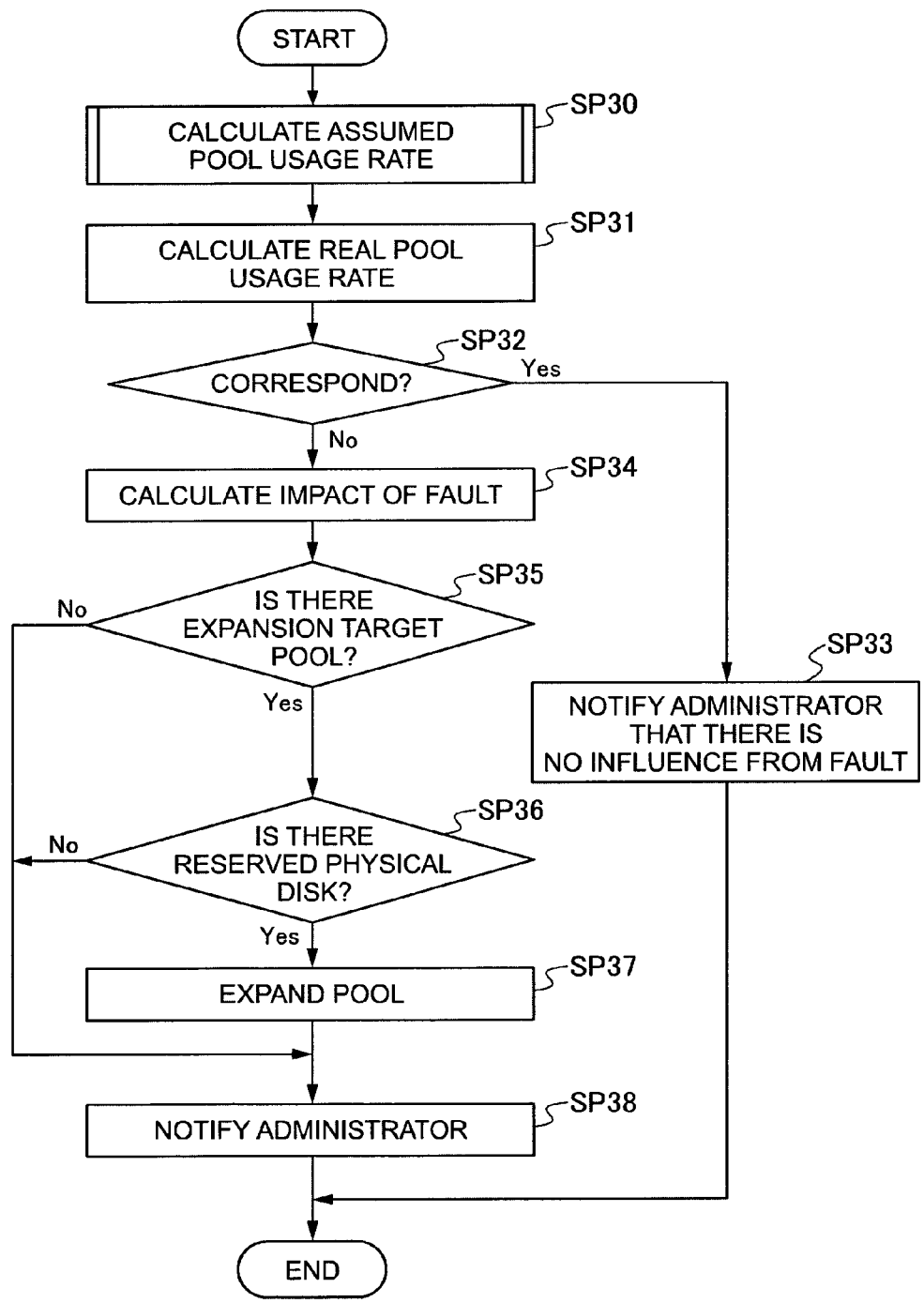
FIG. 18 is a flowchart showing the processing routine of fault extent notification processing according to the second embodiment.

FIG. 18 shows the processing routine of the extent of impact notification processing according to the second embodiment to be executed by the CPU 23 of the storage system 81 in substitute for the extent of impact notification processing according to the first embodiment explained with reference to FIG. 12 when a fault occurs in any one of the pools 41 in the storage system 81.

The CPU 23 starts the fault extent notification processing shown in FIG. 18 when a fault occurs in any one of the pools 41, and performs the processing of step SP30 to step SP34 as with the processing of step SP10 to step SP14 of FIG. 12.

Subsequently, the CPU 23 determines whether there is a pool 41, among the respective pools 41 that are affected by the fault that occurred in the pool 41, in which the used capacity rate in relation to the total capacity has already exceeded the recommended threshold of that pool 41 that was calculated at step SP34 (SP35).

If the CPU 23 obtains a negative result in the foregoing determination, it proceeds to step SP38. Meanwhile, if the CPU 23 obtains a positive result in the foregoing determination, it determines whether a reserved physical disk 82 (FIG. 16) is associated with the pool 41 in which the used capacity rate in relation to the total capacity has already exceeded the recommended threshold of that pool 41 that was calculated at step SP34 (SP36).

The CPU 23 expands the capacity of that pool 41 by incorporating the storage area provided by the reserved physical disk 82 associated with that pool 41 into the capacity of that pool 41 according to the foregoing pool expansion program 83 regarding the pool 41 in which a positive result was obtained in the foregoing determination. The CPU 23 concurrently stores the pool ID of the expanded pool 41 in the corresponding expanded pool ID column 84C of the pool expansion management table 84 (SP37).

The CPU 23 thereafter notifies the existence of pools 41 that are affected by the fault to the management computer 6 separate from the notification of the occurrence of the fault. The contents of the notification include the pool ID of the pools 41 included in the extent of impact of the fault, the recommended threshold of those pools 41 calculated as described above, and the pool ID of the pool 41 that will be affected by the fault but has no reserved physical disk 82.

The CPU 23 thereafter ends the extent of impact notification processing.

As described above, with the computer system 80 according to the present embodiment, in addition to searching for the extent of impact of the fault and notifying the administrator when a fault occurs in the pool 41 of the storage system 81, since the capacity of the other pools 41 that will be affected by that fault is expanded, it is possible to effectively prevent the capacity of such other pools 41 from becoming depleted, and thereby construct a computer system with high fault tolerance.

(3) Third Embodiment

Figure 19:
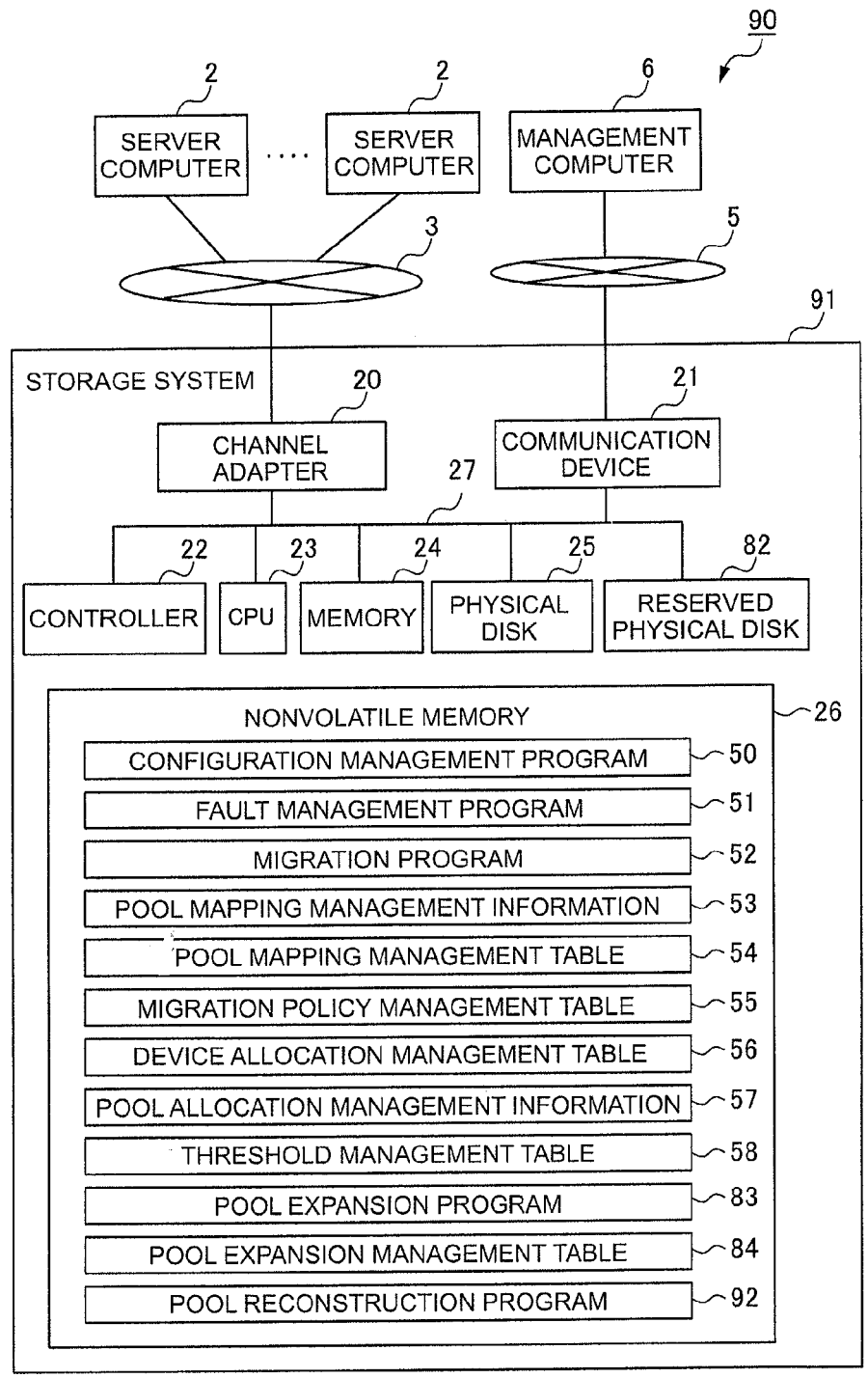
FIG. 19 is a block diagram showing the overall configuration of a computer system according to the third embodiment.

FIG. 19, in which the components corresponding to those of FIG. 16 are respectively given the same reference numerals, shows a computer system 90 according to the third embodiment. The computer system 90 is configured the same as the computer system 80 according to the second embodiment excluding the point that a pool reconstruction program 92 is stored in the nonvolatile memory 26 of the storage system 91.

The pool reconstruction program 92 is a program for returning data stored in another pool 41 (pool 41 which should have moved data to the pool 41 subject to a failure in the second embodiment) during the occurrence of a fault of that pool 41 after the fault recovery thereof to the primary pool (pool subject to a fault) 41, and returning the status of the other pool 41 to a normal state.

Figure 20:
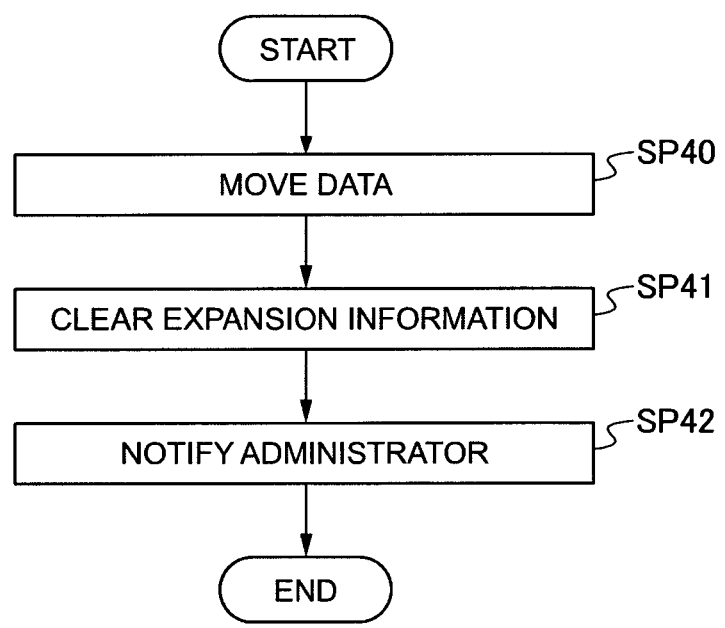
FIG. 20 is a flowchart showing the processing routine of pool reconstruction processing.

FIG. 20 shows the processing routine of the pool reconstruction processing to be executed by the CPU 23 of the storage system 91 based on the pool reconstruction program.

When the CPU 23 recognizes that the pool subject to a fault has been recovered from such fault due to the replacement of the physical disk 25 or the like based on an input by the administrator, it starts the pool reconstruction processing, and foremost refers to the pool expansion management table 84 (FIG. 17) and detects all pools 41 which should have been expanded due to the fault of that pool 41, and moves the migration target data that is accumulated in those pools 41 to the pool 41 that recovered from the fault based on the migration program 52 (FIG. 19) and according to the migration policy explained with reference to FIG. 7 (SP40).

Subsequently, the CPU 23 deletes the pool ID of the pools 41 from which data was moved at step SP40 from the corresponding expanded pool ID column 84C (FIG. 17) in the pool expansion management table 84 (SP41). The CPU 23 thereafter notifies the management computer 6 that the foregoing recovery processing was executed (SP42), and then ends the pool reconstruction processing.

As described above, with the computer system 90 according to the present embodiment, since data accumulated in the pools 41 that were affected by the fault is moved, after the fault recovery of the pool 41, to the pool 41 that recovered from the fault, it is possible to reliably prevent the capacity of the pools 41 that were affected by the fault from becoming depleted, while at the same time promptly recovering the pool 41 from the fault.

(4) Other Embodiments

Although the first to third embodiments described above described cases of applying the present invention to the storage systems 1, 81, 91 configured as shown in FIG. 1, FIG. 16 and FIG. 19, the present invention is not limited thereto, and may be broadly applied to other storage systems of various configurations.

Moreover, although the first to third embodiments described above explained cases of applying the physical disk 25 as the storage medium for providing a storage area to the pools 41, the present invention is not limited thereto, and, for instance, a storage medium other than the physical disk 25 such as a semiconductor memory may also be used.

Moreover, although the first to third embodiment described above explained cases of configuring the configuration management unit for dynamically allocating the storage area to the logical device 42 according to a data write request from the server computer 2 for writing data into the logical device 42, the migration unit for changing the pool 41 to allocate the storage area to another pool 41 according to an access status from the server computer 2 to the data written into the logical device 42, and moving the data to the other pool, and the fault management unit for identifying, when a fault occurs in any one of the pools, an extent of impact of the fault and notifying the identified extent of impact of the fault to an administrator from the CPU 23 that governs the operational control of the overall storage systems 4, 81, 91 and program, the present invention is not limited thereto, and the functions of the configuration management unit, the migration unit and the fault management unit may be realized by respectively providing dedicated hardware.

Similarly, although the second embodiment described above explained a case of realizing, in addition to the functions of the configuration management unit, the migration unit and the fault management unit, the function as the pool expansion unit for expanding the capacity of the pool 41 in which the threshold of the used capacity rate in relation to the total capacity has exceeded the recommended threshold also with the CPU 23, the present invention is not limited thereto, and the function of the pool expansion unit may also be realized by providing dedicated hardware.

Similarly, although the third embodiment described above explained a case of realizing, in addition to the functions of the configuration management unit, the migration unit and the fault management unit, the function as the pool reconstruction unit for moving, after the fault recovery of the pool that was subject to a fault, data stored in the pool 41 with an expanded capacity to the pool 41 that recovered from the fault also with the CPU 23, the present invention is not limited thereto, and the function of the pool reconstruction unit may also be realized by provided dedicated hardware.

Moreover, although the first to third embodiments described above explained a case of starting the fault extent notification processing explained with reference to FIG. 12 at the timing that the CPU 23 detects a fault in any one of the pools 41, the present invention is not limited thereto, and this may also be started at the timing that is delayed for a prescribed period after the CPU 23 detects the occurrence of a failure in any one of the pools 41. This is in consideration of the fact that the impact of the fault of the pool 41 appears after the lapse of a certain period of time, and not immediately, after the occurrence of such fault. Moreover, when the CPU 23 detects the occurrence of a fault in any one of the pools 41, the fault extent notification processing may thereafter be executed periodically.

Moreover, although the first to third embodiments described above explained a case where the recommended threshold of the respective pools 41 was calculated based on Formula (I) at step SP14 of the fault extent notification processing, the present invention is not limited thereto, and the recommended threshold may be calculated based on other methods.

In addition, although the first to third embodiments described above explained a case of calculating the assumed pool allocation rate of the respective logical devices 42 according to the methods described with reference to FIG. 14 and FIG. 15, the present invention is not limited thereto, and the assumed pool allocation rate of the respective logical devices 42 may also be calculated based on other methods.

INDUSTRIAL APPLICABILITY

The present invention can be broadly applied to storage system of various configurations that provide a virtual logical device to a host system.

The invention claimed is:

1. A storage system connected to a host system, comprising:
   a storage medium for storing data sent from the host system; and
   a controller including a memory and a processor,
   wherein the controller comprises:
   a configuration management unit for managing a storage area provided by the storage medium by dividing it into a plurality of pools, providing a virtual logical device to the host system, and dynamically allocating the storage area to the logical device from a pool associated with the logical device according to a data write request from the host system for writing data into the logical device;
   a migration unit for changing the pool to allocate the storage area to an area that stored the data in the logical device to another pool according to an access status from the host system to the data written into the logical device, and controlling the storage medium for moving the data to the other pool; and
   a fault management unit for managing a correspondence relationship of the logical device and the pool, identifying, when a fault occurs in any one of the pools, an extent of impact of the fault based on the correspondence relationship of the logical device and the pool, and notifying the identified extent of impact of the fault to an administrator, and
   wherein the fault management unit compares a theoretical value of a ratio of the storage area that is assumed to be allocated by the respective pools associated with the logical device to that logical device, and a measured value of a ratio of the storage area that has been actually allocated by the respective pools to that logical device, and identifies the extent of impact of the fault based on the comparative result.

2. The storage system according to claim 1,
   wherein the memory of the controller stores:
   a configuration management program for managing the configuration of physical resources and logical resources of the storage system;
   a migration program for moving data stored in a pool to another pool; and
   a fault management program for detecting a fault that occurred in the physical resources and the logical resources of the storage system, and for executing measures in accordance with contents of the fault,
   wherein the configuration management unit of the controller is configured from the processor and the configuration management program,
   wherein the migration unit of the controller is configured from the processor and the migration program, and
   wherein the fault management unit of the controller is configured from the processor and the fault management program.

3. The storage system connected to a host system, comprising:
   a storage medium for storing data sent from the host system; and
   a controller including a memory and a processor,
   wherein the controller comprises:
   a configuration management unit for managing a storage area provided by the storage medium by dividing it into a plurality of pools, providing a virtual logical device to the host system, and dynamically allocating the storage area to the logical device from a pool associated with the logical device according to a data write request from the host system for writing data into the logical device;
   a migration unit for changing the pool to allocate the storage area to an area that stored the data in the logical device to another pool according to an access status from the host system to the data written into the logical device, and controlling the storage medium for moving the data to the other pool; and
   a fault management unit for managing a correspondence relationship of the logical device and the pool, identifying, when a fault occurs in any one of the pools, an extent of impact of the fault based on the correspondence relationship of the logical device and the pool, and notifying the identified extent of impact of the fault to an administrator, and wherein, if the theoretical value of the ratio of the storage area and the measured value of the ratio of the storage area do not coincide, the fault management unit calculates a rise rate of an amount of the storage area per unit of time allocated to any one of the logical devices for each pool associated with that logical device, and determines whether the pool is included in the extent of impact of the fault based on the calculation result.

4. The storage system according to claim 3,
wherein the migration unit manages a predetermined migration condition concerning the access status for moving data stored in a pool to another pool, moves the data to the other pool according to the migration condition, and changes the pool to allocate the storage area to an area that stored the data in the logical device to the other pool.

5. The storage system according to claim 3,
wherein the migration condition is a transitional period from the last access date and time of the host system to the data.

6. A storage system connected to a host system, comprising:
a storage medium for storing data sent from the host system;
and a controller including a memory and a processor,
wherein the controller comprises:
a configuration management unit for managing a storage area provided by the storage medium by dividing it into a plurality of pools, providing a virtual logical device to the host system, and dynamically allocating the storage area to the logical device from a pool associated with the logical device according to a data write request from the host system for writing data into the logical device;
a migration unit for changing the pool to allocate the storage area to an area that stored the data in the logical device to another pool according to an access status from the host system to the data written into the logical device, and controlling the storage medium for moving the data to the other pool; and
a fault management unit for managing a correspondence relationship of the logical device and the pool, identifying, when a fault occurs in any one of the pools, an extent of impact of the fault based on the correspondence relationship of the logical device and the pool, and notifying the identified extent of impact of the fault to an administrator,
wherein the fault management unit manages, for each pool, a threshold of a used capacity rate of the pool in relation to the total capacity of that pool, and notifies the administrator when the rate of any one of the pools exceeds the threshold,
wherein, if a fault occurs in any one of the pools, the fault management unit notifies the administrator of a recommended value of the threshold regarding the respective pools included in the extent of impact of the fault, and
wherein the fault management unit calculates a recommended value F of the threshold of the respective pools based on the following formula with the time empirically considered to be capable of recovering a pool that was subject to a fault up to the depletion of that pool as T, and a rise rate of a real allocated size per unit of time of that pool as D:$F=1-(D\times T)$.

7. The storage system according to claim 5, further comprising:
a pool expansion unit for expanding the capacity of a pool in which a threshold of the used capacity rate in relation to the total capacity exceeds the recommended value.

8. The storage system according to claim 7, further comprising:
a pool reconstruction unit for moving, after the recovery of a pool that was subject to a fault, data stored in the pool with the expanded capacity to a pool that recovered from the fault.

9. A control method of a storage system comprising a storage medium for storing data sent from the host system, and a controller, the controller including a memory and a processor, the control method comprising:
managing, by the controller, a storage area provided by the storage medium by dividing it into a plurality of pools, providing a virtual logical device to the host system, and dynamically allocating the storage area to the logical device from a pool associated with the logical device according to a data write request from the host system for writing data into the logical device;
changing, by the controller, a pool to allocate the storage area to an area that stored the data in the logical device to another pool according to an access status from the host system to the data written into the logical device, and controlling the storage medium for moving the data to the other pool;
identifying, by the controller, when a fault occurs in any one of the pools, an extent of impact of the fault based on the correspondence relationship of the logical device and the pool, and notifying the identified extent of impact of the fault to an administrator; and
comparing, by the controller, a theoretical value of a ratio of the storage area that is assumed to be allocated by the respective pools associated with the logical device to that logical device, and a measured value of a ratio of the storage area that has been actually allocated by the respective pools to that logical device, and identifying the extent of impact of the fault based on the comparative result.

\* \* \* \* \*